US010176428B2

(12) United States Patent
Sridhara et al.

(10) Patent No.: US 10,176,428 B2
(45) Date of Patent: Jan. 8, 2019

(54) BEHAVIORAL ANALYSIS FOR SECURING PERIPHERAL DEVICES

(71) Applicant: QUALCOMM Incorporated, San Diego, CA (US)

(72) Inventors: Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 14/207,754

(22) Filed: Mar. 13, 2014

(65) Prior Publication Data

US 2015/0262067 A1    Sep. 17, 2015

(51) Int. Cl.
| | |
|---|---|
| *G06F 15/18* | (2006.01) |
| *G06N 5/04* | (2006.01) |
| *G06N 99/00* | (2010.01) |
| *G06F 11/30* | (2006.01) |
| *G06F 21/55* | (2013.01) |

(Continued)

(52) U.S. Cl.
CPC ........... *G06N 5/04* (2013.01); *G06F 11/3013* (2013.01); *G06F 21/552* (2013.01); *G06F 21/554* (2013.01); *G06N 99/005* (2013.01); *H04L 63/14* (2013.01); *H04W 12/12* (2013.01)

(58) Field of Classification Search
None
See application file for complete search history.

(56) References Cited

U.S. PATENT DOCUMENTS 8,850,589 B2 *  9/2014  Pistoia ................. G06F 21/577
                                                      713/188
2005/0177720 A1    8/2005  Katano
                    (Continued)

FOREIGN PATENT DOCUMENTS

WO    2013009302 A1    1/2013

OTHER PUBLICATIONS

Zhaohui Wang, Ryan Johnson, Rahul Murmuria, Angelos Stavrou, "Exposing Security Risks for Commercial Mobile Devices", I. Kotenko and V. Skormin (Eds.): MMM-ACNS 2012, LNCS 7531, 2012, pp. 3-21.*

(Continued)

*Primary Examiner* — Luis A Sitiriche
(74) *Attorney, Agent, or Firm* — The Marbury Law Group

(57) ABSTRACT

The various aspects configure a mobile computing device to efficiently identify, classify, model, prevent, and/or correct the conditions and/or behaviors occurring on the mobile computing device that are related to one or more peripheral devices connected to the mobile computing device and that often degrade the performance and/or power utilization levels of the mobile computing device over time. In the various aspects, the mobile computing device may obtain a classifier model that includes, tests, and/or evaluates various conditions, features, behaviors and corrective actions on the mobile computing device that are related to one or more peripheral devices connected to the mobile computing device. The mobile computing device may utilize the classifier model to quickly identify and correct undesirable behaviors occurring on the mobile computing device that are related to the one or more connected peripheral devices.

24 Claims, 14 Drawing Sheets

(51) Int. Cl.
*H04L 29/06* (2006.01)
*H04W 12/12* (2009.01)

(56) References Cited

U.S. PATENT DOCUMENTS

| | | | | |
|---|---|---|---|---|
| 2007/0240222 | A1* | 10/2007 | Tuvell | G06F 21/56 726/24 |
| 2009/0199296 | A1 | 8/2009 | Xie et al. | |
| 2010/0132038 | A1* | 5/2010 | Zaitsev | G06F 21/552 726/22 |
| 2011/0023108 | A1 | 1/2011 | Geldermann et al. | |
| 2012/0167218 | A1* | 6/2012 | Poornachandran | G06F 21/566 726/24 |
| 2012/0210423 | A1 | 8/2012 | Friedrichs et al. | |
| 2012/0222120 | A1* | 8/2012 | Rim | G06F 21/566 726/24 |
| 2013/0097706 | A1* | 4/2013 | Titonis | G06F 21/56 726/24 |
| 2013/0303154 | A1 | 11/2013 | Gupta et al. | |
| 2014/0053261 | A1* | 2/2014 | Gupta | G06F 21/55 726/22 |

OTHER PUBLICATIONS

David, F.M., Chan, E.M., Carlyle, J.C., Campbell, R.H, "Cloaker: Hardware Supported Rootkit Concealment", Security and Privacy, 2008. SP 2008. IEEE Symposium on, May 22, 2008, pp. 296-310.*
Sahs, J., Khan, L., "A Machine Learning Approach to Android Malware Detection", Intelligence and Security Informatics Conference (EISIC), 2012 European, Aug. 24, 2012, pp. 141-147.*
Iker Burguera Hidalgo, "Behavior-based malware detection system for the Android platform", Thesis published by Department of Computer and Information Science, Linkopings universitet, SE-581 83 Linkoping, Sweden, Sep. 27, 2011, pp. 1-74.*
Thomas Biasing, Leonid Batyuk, Aubrey-Derrick Schmidt, Seyit Ahmet Camtepe, and Sahin Albayrak, "An Android Application Sandbox System for Suspicious Software Detection", Malicious and Unwanted Software (MALWARE), 2010 5th International Conference on, Oct. 19, 2010, pp. 55-62.*
Borja Sanz, Igor Santos, Carlos Laorden, Xabier Ugarte-Pedrero and Pablo Garcia Bringas, "On the Automatic Categorisation of Android Applications", Proceedings of 9th Annual IEEE Consumer Communications and Networking Conference—Security and Content Protection, 2012, pp. 140-153.*
Matthias Lange, Steffen Liebergeld, Adam Lackorzynski, Alexander Warg, Michael Peter, "L4Android: A Generic Operating System Framework for Secure Smartphones", SPSM'11, Oct. 17, 2011, Chicago, Illinois, USA, 2011, pp. 39-50.*
Jonathan D. Stueckle, "Andriod Protection System: A Signed Code Security Mechanism for Smartphone Applications", Master's Thesis published by Department of the Air Force, Air University, Air Force ZInstitute of Technology, Wright-Patterson Air Force Base, Ohio, 2011, pp. 1-87.*
Sparrow G., "FLAWS in Apple iOS Allow Malware through Peripherals like Chargers," Computer Security, Enigma Software Group, Aug. 7, 2013, Retrieved on Dec. 20, 2013, Retrieved from the Internet < URL: http://www.enigmasoftware.com/flaws-apple-ios-allow-malware-through-peripherals-chargers/ >, 4 pages.
Buennemeyer T.K., et al., "Mobile Device Profiling and Intrusion Detection Using Smart Batteries", Hawaii International Conference on System Sciences, Proceedings of the 41st Annual, IEEE, Piscataway, NJ, USA, Jan. 1, 2008 (Jan. 1, 2008), p. 296, XP031208166, ISBN: 978-0-7695-3075-8.
International Search Report and Written Opinion—PCT/US2015/020228—ISA/EPO—dated May 20, 2015.

* cited by examiner

BEHAVIORAL ANALYSIS FOR SECURING PERIPHERAL DEVICES

BACKGROUND

Cellular and wireless communication technologies have seen explosive growth over the past several years. This growth has been fueled by better communications, hardware, larger networks, and more reliable protocols. As a result wireless service providers are now able to offer their customers unprecedented levels of access to information, resources, and communications.

To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile computing device's long-term and continued performance and power utilization levels. Thus, identifying and correcting the conditions and/or mobile computing device behaviors that may negatively impact mobile computing device long term and continued performance and power utilization levels is beneficial to consumers.

SUMMARY

The various aspects relate to configuring a mobile computing device to efficiently identify, classify, model, prevent, and/or correct the conditions and/or behaviors occurring on the mobile computing device that are related to one or more peripheral devices connected to the mobile computing device and that may degrade the performance and/or power utilization levels of the mobile computing device over time. In the various aspects, a mobile computing device may obtain a classifier model that includes various conditions, features, behaviors and corrective actions related to one or more peripheral devices connected to the mobile computing device and may utilize the classifier model to quickly identify and correct undesirable behaviors (e.g., malicious behaviors, performance-degrading behaviors, and/or any other behaviors producing unwanted or harmful effects) occurring on the mobile computing device that are related to the one or more connected peripheral devices.

In various aspects, the mobile computing device may use the classifier model to perform real-time behavior monitoring and analysis operations of features on the mobile computing device related to the peripheral device to determine whether the peripheral device is causing undesirable behavior to occur on the mobile computing device, whether undesirable behavior on the mobile computing device is negatively affecting the peripheral device, and/or whether the combined activities of the one or more peripheral devices and the mobile computing device are collectively causing undesirable behavior to occur on the mobile computing device.

In an aspect, the mobile computing device may generate a classifier model that tests/evaluates features related to a peripheral device connected to the mobile computing device locally. In such an aspect, the mobile computing device may identify these features based on the expanded capabilities and/or functionality that the mobile computing device gains from connecting with a peripheral device, such as the expanded capabilities available to the mobile computing device via the peripheral device and/or the expanded capabilities on the mobile computing device related to controlling or using the peripheral device.

In another aspect, the mobile computing device may generate the classifier model by observing behaviors on the mobile computing device related to the peripheral device over time and identifying a set of tests/evaluations for features related to the peripheral device to include in the classifier model based on one or more behaviors on the mobile computing device that are expected to occur. In a further aspect, these expected behaviors may represent typical or benign behaviors and thus may be used as a reference point when classifying behaviors on the mobile computing device related to the peripheral device in the future as benign or undesirable (e.g., malicious or performance degrading).

In another aspect, the mobile computing device may identify a connected peripheral device and may request a classifier model from a server that tests/evaluates features on the mobile computing device related to the peripheral device.

In another aspect, the mobile computing device may receive from the server a large or full classifier model that addresses features for various mobile computing devices. The mobile computing device may generate from the full classifier a lean classifier model that includes relevant features for monitoring malicious/performance-degrading behavior on the device. The mobile computing device may also identify and modify the lean classifier model to include tests/evaluations for one or more features determined to be related to a peripheral device connected to the mobile computing device, thereby enabling the mobile computing device to focus on observing, analyzing, and classifying behaviors of features on the mobile computing device related to the peripheral device that are particularly relevant to the performance of the mobile computing device.

In further aspects, the mobile computing device may observe behaviors occurring on the mobile computing device related to the peripheral device and may retrieve additional, contextual behavior information directly from the peripheral device, such as via an API on the peripheral device configured for that purpose. In a further aspect, the mobile computing device may optionally receive observations from the peripheral device that may provide additional information regarding the state, configuration, performance, etc. of the peripheral device for use in analyzing/classifying behaviors on the mobile computing device related to the peripheral device.

In another aspect, the mobile computing device may be unable to directly obtain relevant behavior information from the peripheral device, in which case the mobile computing device may indirectly obtain behavior information regarding the peripheral device's performance, configuration, activities, etc. by observing various communications between the peripheral device and the mobile computing device and/or by monitoring inputs received by the mobile computing device from the peripheral device.

Various aspects include a method of generating data models in a mobile computing device connected to a peripheral device that may include obtaining a classifier model comprising features related to the peripheral device, observing behaviors of the features related to the peripheral device, generating a behavior vector for a configuration of the mobile computing device based on the observed behaviors, and applying the behavior vector to the classifier model to detect undesirable behavior on the mobile computing device related to the peripheral device. In an aspect, undesirable behavior related to the peripheral device may include at least one of undesirable behavior occurring on the mobile computing device that is caused by the peripheral device, undesirable behavior occurring on the peripheral device that is caused by the mobile computing device, and undesirable behavior caused by activities occurring on both of the mobile computing device and the peripheral device.

In an aspect, obtaining a classifier model may include identifying a capability related to the peripheral device, determining a feature on the mobile computing device related to the identified capability, and generating the classifier model based on the determined feature. In another aspect, obtaining a classifier model may include observing behaviors on the mobile computing device related to the peripheral device over a period of time, identifying a behavior related to the peripheral device that is expected to occur based on the behaviors observed on the mobile computing device over the period of time, determining a set of features on the mobile computing device related to the expected behavior, and generating the classifier model based on the determined set of features related to the expected behavior. In another aspect, obtaining a classifier model may include receiving a full classifier model generated on a server from a cloud data set of information provided by a plurality of mobile computing devices, generating a lean classifier model including features relevant to the mobile computing device, determining a feature on the mobile computing device related to the peripheral device, and modifying the lean classifier model to include the determined feature related to the peripheral device.

An aspect method may also include receiving from the peripheral device observations of behaviors occurring on the peripheral device, in which generating a behavior vector for a configuration of the mobile computing device based on the observed behaviors may include generating the behavior vector based on at least one of the observed behaviors on the mobile computing device and the observations received from the peripheral device. An aspect method may also include observing behaviors on the mobile computing device related to at least one of communications between the mobile computing device and the peripheral device and inputs received from the peripheral device, in which generating a behavior vector for a configuration of the mobile computing device based on the observed behaviors may include generating the behavior vector based on at least one of the behaviors related to the communications between the mobile computing device and the peripheral device and the inputs received from the peripheral device.

Further aspects include a mobile computing device that includes a memory and a processor coupled to the memory in which the processor is configured to perform operations of the methods described above.

Further aspects include a mobile computing device including means for performing functions of the methods described above.

Further aspects include a non-transitory computer-readable storage medium having stored thereon processor-executable instructions configured to cause a mobile computing device processor to perform operations of the methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

Figure 1:
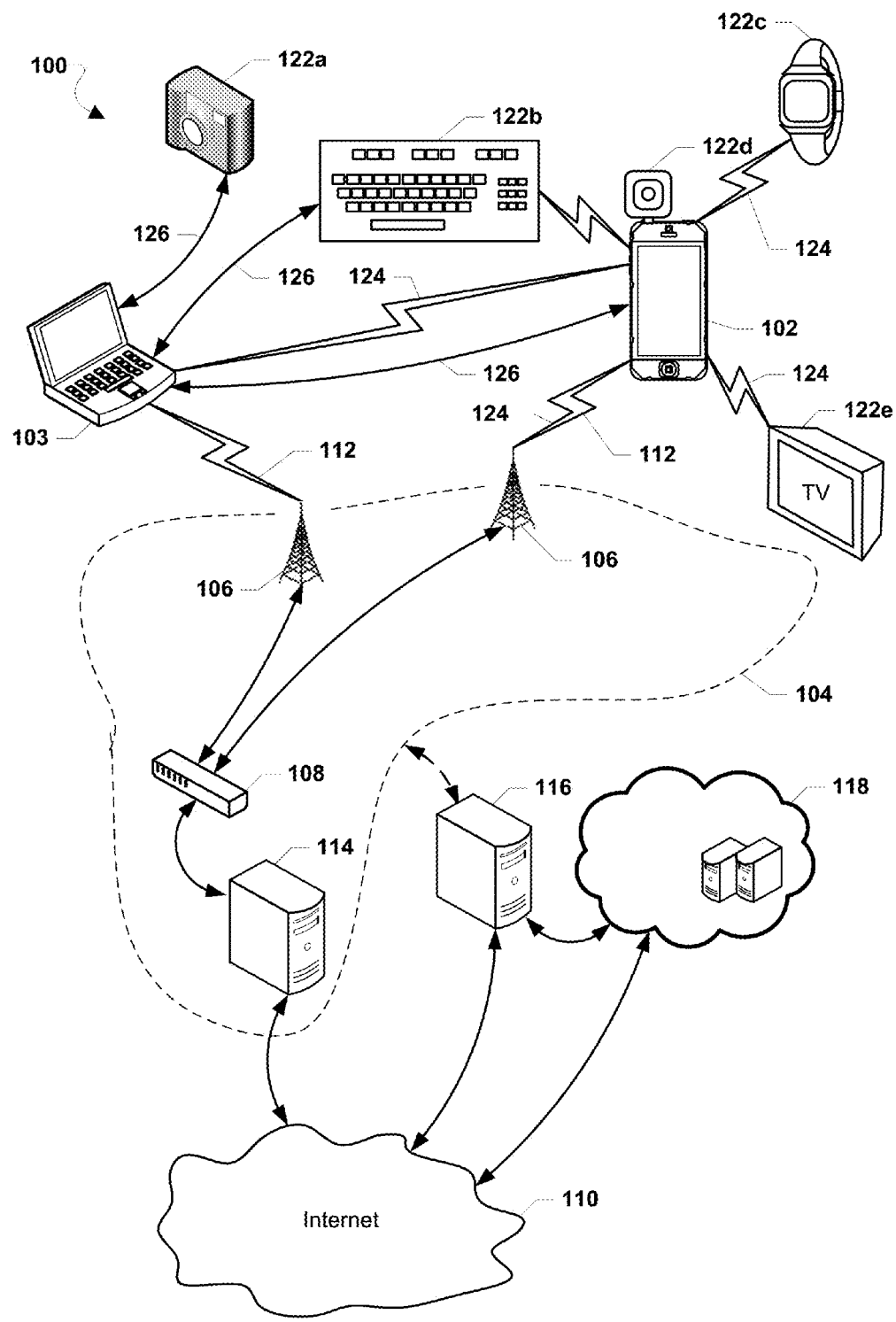
FIG. 1 is a communication system block diagram illustrating network components of an example telecommunication system that is suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "mobile computing device" is used herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Generally, the performance and power efficiency of a mobile computing device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile computing device, which may consume many of the mobile computing device's processing and battery resources, slow or render the mobile computing device useless for extended periods of time, and/or otherwise degrade the user experience. In addition, these solutions are typically limited to detecting known viruses and malware, and do not address the multiple complex factors and/or the interactions that often combine to contribute to a mobile computing device's degradation over time (e.g., when the performance degradation is not caused by viruses or malware). For these and other reasons, existing anti-virus, firewall, and encryption products do not provide adequate solutions for identifying the numerous factors that may contribute to a mobile computing device's degradation over time, for preventing mobile computing device degradation, or for efficiently restoring an aging mobile computing device to its original condition.

Mobile computing devices are resource constrained systems that have relatively limited processing, memory, and energy resources. Modern mobile computing devices are also complex systems having a large variety of factors that may contribute to the degradation in performance and power utilization levels of the mobile computing device over time. Examples of factors that may contribute to performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of the complex yet resource-constrained systems of modern mobile computing devices. As such, it is difficult for users, operating systems, or application programs (e.g., anti-virus software, etc.) to accurately and efficiently identify the sources of such problems. As a result, mobile computing device users currently have few remedies for preventing the degradation in performance and power utilization levels of a mobile computing device over time, or for restoring an aging mobile computing device to its original performance and power utilization levels.

Currently, solutions exist for modeling the behavior of an application program executing on a computing device, and these solutions may be used along with machine learning techniques to determine whether a software application is malicious or benign. However, these solutions are not suitable for use on mobile computing devices because they require evaluating a very large corpus of behavior information, do not generate behavior models dynamically, do not intelligently prioritize the features in the behavior model, are limited to evaluating an individual application program or process, and/or require the execution of computationally-intensive processes in the mobile computing device. As such, implementing or performing these existing solutions in a mobile computing device may have a significant, negative and/or user-perceivable impact on the responsiveness, performance, or power consumption characteristics of the mobile computing device.

For example, a computing device may be configured to use an existing machine learning-based solution to access and use a large corpus of training data, derive a model that takes as input a feature vector, and use this model to determine whether a software application of the computing device is malicious or benign. However, such a solution does not generate a full classifier model (i.e., a robust data or behavior model) that describes the large corpus of behavior information in a format or information structure (e.g., finite state machine, etc.) that may be used by a mobile computing device to quickly generate a lean classifier model. For at least this reason, such a solution does not allow a mobile computing device to generate a lean classifier model that includes, tests, or accounts for features that are particularly relevant to the performance and/or operation of the mobile computing device. In addition, this solution does not allow a mobile computing device to generate a lean classifier model that intelligently identifies or prioritizes the features in accordance to their relevance to classifying a specific behavior in the specific mobile computing device in which the model is used. For these and other reasons, such a solution cannot be used by a mobile computing device processor to quickly and efficiently identify, analyze, or classify a complex mobile computing device behavior without having a significant negative or user-perceivable impact on the responsiveness, performance, or power consumption characteristics of the mobile computing device.

Additionally, because modern mobile computing devices are highly configurable and complex systems, the features that are most important for determining whether a particular mobile computing device behavior is benign or non-benign/undesirable (e.g., malicious or performance-degrading) may be different in each mobile computing device. Further, a different combination of features may require monitoring and/or analysis in each mobile computing device in order for that mobile computing device to quickly and efficiently determine whether a particular behavior is benign or not benign. Yet, the precise combination of features that require monitoring and analysis, and the relative priority or importance of each feature or feature combination, can often only be determined using device-specific information obtained from the specific mobile computing device in which a behavior is to be monitored or analyzed. For these and other reasons, behavior models generated in any computing device other than the specific device in which they are used cannot include information that identifies the precise combination of features that are most important to classifying a behavior in that device.

Further, mobile computing devices may also gain or receive access to additional features, capabilities, functionality, etc. by connecting to one or more peripheral devices. For example, a mobile computing device connected to a peripheral device may have an expanded capability (e.g., the ability to play audio remotely through a Bluetooth® speaker) or an ability to control aspects of the peripheral device (e.g., the ability to change the channel on a smart TV peripheral device). Thus, the functionalities and capabilities present on or available to a mobile computing device may change substantially and quickly when the mobile computing device connects to (or disconnects from) a peripheral device, thereby potentially expanding (or narrowing) the scope of the behaviors and activities occurring on the mobile computing device that may be relevant to detecting malicious or performance-degrading activity on the mobile computing device.

For example, if a mobile computing device connects to a peripheral device that includes a biometric sensor (e.g., a fingerprint reader, a retina scanner, etc.) for use in authorizing financial transactions, then features that test conditions on the mobile computing device relating to the access and use of the biometric sensors are likely to be relevant in determining whether an observed behavior on the mobile computing device related to accessing financial software is malicious, performance degrading, or benign. For example, the pattern of access and use of the biometric sensors on the peripheral device by the mobile computing device may indicate that a malicious application on the mobile computing device is authorizing financial transactions using stored biometric data received from the biometric sensor peripheral device without the user's knowledge or consent. On the other hand, features that test conditions relating to the access and use of these sensors are not likely to be relevant in determining whether the observed behavior of accessing financial software is malicious or benign when the peripheral device is not connected to the mobile computing device because the mobile computing device may no longer have access to biometric sensors to authorize financial transactions.

Many current behavior modeling solutions implement a "one-size-fits-all" static approach to modeling the behaviors of a computing device, and are therefore not suitable for use in mobile computing devices. That is, these solutions typically generate the behavior models so that they are generic and may be used in many computing devices and/or with a variety of different hardware and software configurations. As such, these generic behavior models often include/test a very large number of features, many of which are not relevant to (and thus cannot be used for) identifying, analyzing, or classifying a behavior in the specific computing device in which they are actually used. In addition, these solutions do not assign relative priorities to features based on their relevance to classifying a specific behavior in the specific mobile computing device in which the model is used. Further, such solutions are not able to address the behavior of peripheral devices or the influence of peripheral devices on the computing device since peripheral devices may be add-ons and later developed hardware. Therefore, these solutions typically require that a computing device apply behavior models that include a large number of disorganized, improperly prioritized, or irrelevant features. Such models are not suitable for use in resource-constrained mobile computing devices because they may cause the mobile computing device processor to analyze a large number of features that are not useful for identifying a cause or source of the mobile computing device's degradation over time. As such, these existing solutions are not suitable for use in complex-yet resource-constrained mobile computing devices, especially in light of mobile computing devices' ability to change their capabilities/functionality by connecting to peripheral device.

Some contemporary solutions attempt to detect malicious activity occurring on peripheral devices by performing scans of the peripheral device or by analyzing information queried from the peripheral device for viruses, malware, etc. However, these solutions do not provide mechanisms for detecting malicious and/or performance-degrading behaviors on the mobile computing device caused by the peripheral device, nor do these solutions anticipate, monitor for, or protect against various types of undesirable behavior on the peripheral device caused by the mobile computing device.

Thus, current solutions do not anticipate or account for changes in the mobile computing device's features, capabilities, and/or functionalities that may occur when the mobile computing device connects to one or more peripheral devices. Specifically, because current solutions either generate a generic behavior model for a mobile computing device that does not accurately identify features on the mobile computing device relating to the access and use peripheral device and because current solutions focus solely on detecting malicious activity on the peripheral device, these solutions are unsuitable for generating behavioral models that test the complicated conditions or features on the mobile computing device that can result from the mobile computing device connecting to any of thousands of different kinds of peripheral devices that may be connected to and used with mobile computing devices.

In overview, the various aspects overcome these limitations of current solutions by configuring a mobile computing device to efficiently identify, classify, model, prevent, and/or correct the conditions and/or behaviors occurring on the mobile computing device that are related to one or more peripheral devices connected to the mobile computing device and that often degrade the performance and/or power utilization levels of the mobile computing device over time. In the various aspects, the mobile computing device may obtain a classifier model that includes various conditions, features, behaviors and corrective actions related to one or more peripheral devices connected to the mobile computing device and may utilize the classifier model to quickly identify and correct undesirable behaviors (e.g., malicious behaviors, performance-degrading behaviors, and/or any other behaviors producing unwanted or harmful effects) occurring on the mobile computing device that are related to the one or more connected peripheral devices.

In various aspects, the mobile computing device may use the classifier model to test behaviors of features on the mobile computing device related to the peripheral device to determine whether the peripheral device is causing undesirable behavior to occur on the mobile computing device (e.g., performance-degrading instructions received from a malfunctioning peripheral device and executed on the mobile computing device), whether undesirable behavior on the mobile computing device is negatively affecting the peripheral device (e.g., a malicious application operating on the mobile computing device sending malicious instructions to a peripheral device), and/or whether the combined activities of the one or more peripheral devices and the mobile computing device are collectively causing undesirable behavior to occur on the mobile computing device.

In an aspect, a classifier model (e.g., a full or lean classifier model) may be a finite state machine description or representation of a large corpus of behavior information. The finite state machine may include information that is suitable for expression as a plurality of nodes, boosted decision trees, or decision stumps that each incorporates one or more features on the mobile computing device related to the peripheral device. For example, the finite state machine may be an information structure that may be expressed as a family of boosted decision stumps that collectively identify, describe, test, or evaluate all or many of the features and data points that are relevant to determining whether behavior on the mobile computing device related to a connected peripheral device is benign, malicious, or contributing to degradation in performance of the mobile computing device over time (i.e., performance degrading).

In an aspect, a server may send the mobile computing device a full classifier model (i.e., information structure that includes the finite state machine and/or family of boosted decision stumps, etc.). The mobile computing device may be configured to receive and use the full classifier model to generate lean classifier models or a family of lean classifier models of varying levels of complexity (or "leanness"). To accomplish this, the mobile computing device may prune or cull the robust family of boosted decision trees included in the full classifier model received from the server to generate a lean classifier model that includes a reduced number of boosted decision trees and/or evaluates a limited number of test conditions or features, including features on the mobile computing device related to the one or more peripheral devices connected to the mobile computing device. The mobile computing device may then use these locally generated, lean classifier models to perform real-time behavior monitoring and analysis operations and identify a source or a cause of an undesirable (e.g., malicious or performance-degrading) mobile computing device behavior related to one or more peripheral devices connected to the mobile computing device.

By utilizing full classifier models that describe or express a large corpus of behavior information as a finite state machine, decision nodes, decision trees, or other similar information structures that can be modified, culled, augmented, or otherwise used to generate lean classifier models, the mobile computing device may be able to generate lean classifier models quickly, efficiently and without accessing training data or further communicating with the server, the central database, or the cloud network/server. This significantly reduces the mobile computing device's dependence on the network, and improves the performance and power consumption characteristics of the mobile computing device.

By generating the lean classifier models locally in the mobile computing device to account for features related to one or more peripheral devices connected to the mobile computing device, the various aspects allow the mobile computing device to focus its monitoring operations on the features or factors that are most important for identifying the source or cause of a malicious or performance depredating mobile computing device behavior related to the one or more connected peripheral devices. This allows the mobile computing device to identify and respond to undesirable behaviors—e.g., performance-degrading behaviors on the mobile computing device caused by a peripheral device, malicious behaviors on the mobile computing device that cause degrading performance on the peripheral device, and/or other degrading behaviors on the mobile computing device caused by both the mobile computing device and the peripheral device—without causing a significantly negative or user-perceivable change in the responsiveness, performance, or power consumption characteristics of the mobile computing device.

The various aspects may include a comprehensive behavioral monitoring and analysis system for intelligently and efficiently identifying, preventing, and/or correcting the conditions, factors, and/or behaviors that often degrade performance and/or power utilization levels of a mobile computing device over time. In an aspect, a behavior observer unit, process, daemon, module, or sub-system (herein collectively referred to as a "module" or "unit") of the mobile computing device may instrument or coordinate various application programming interfaces (APIs), registers, counters or other components (herein collectively "instrumented components") at various levels of the mobile computing device system. The observer module may continuously (or near continuously) monitor mobile computing device behaviors related to one or more peripheral devices connected to the mobile computing device by collecting behavior information from the mobile computing device and, optionally, from the one or more peripheral devices. In another aspect, a peripheral device connected to the mobile computing device may also include a behavior observer unit configured to monitor behaviors on the peripheral device and may report those observations to the mobile computing device for use in analyzing and classifying mobile computing device behaviors related to the peripheral device.

The mobile computing device may include a behavior analyzer unit, and the observer module on the mobile computing device and/or on the one or more peripheral devices connected to the mobile computing device may communicate (e.g., via a memory write operation, function call, etc.) the collected behavior information to the behavior analyzer unit. The behavior analyzer unit may receive and use the behavior information to generate behavior vectors, to generate spatial and/or temporal correlations based on the behavior vectors, and to determine whether a particular behavior, condition, sub-system, software application, or process on the mobile computing device related to the peripheral device is benign, suspicious, or not benign/undesirable (i.e., malicious or performance-degrading). The mobile computing device may then use the results of this analysis to heal, cure, isolate, or otherwise fix or respond to identified problems on the mobile computing device related to the one or more peripheral devices, such as by terminating a malware application operating on the mobile computing device that is causing malicious behavior to occur on the peripheral device.

The behavior analyzer unit may also be configured to perform real-time behavior analysis operations, which may include performing, executing, and/or applying data, algorithms, classifiers or models (herein collectively referred to as "classifier models") to the collected behavior information to determine whether a behavior on the mobile computing device related to a peripheral device connected to the mobile computing device is benign or not benign/undesirable (e.g., malicious or performance-degrading). Each classifier model may be a behavior model that includes data and/or information structures (e.g., feature vectors, behavior vectors, component lists, etc.) that may be used by a mobile computing device processor to evaluate a specific feature or aspect of a behavior on the mobile computing device related to a peripheral device connected to the mobile computing device. Each classifier model may also include decision criteria for monitoring a number of features, factors, data points, entries, APIs, states, conditions, behaviors, applications, processes, operations, components, etc. (herein collectively "features") in the mobile computing device. The classifier models may be preinstalled on the mobile computing device, downloaded or received from a server, received from one or more peripheral devices, generated in the mobile computing device, or any combination thereof. The classifier models may be generated by using crowd sourcing solutions, behavior modeling techniques, machine learning algorithms, etc.

In an aspect, the mobile computing device may generate a classifier model that tests/evaluates features related to a peripheral device connected to the mobile computing device locally. In such an aspect, the mobile computing device may identify these features based on the expanded capabilities and/or functionality the mobile computing device gains after connecting with a peripheral device, such as the expanded capabilities available to the mobile computing device via the peripheral device (e.g., the ability to read credit card information by using a credit card reader peripheral device) and/or the expanded capabilities on the mobile computing device related to controlling or using the peripheral device (e.g., the ability to change channels on a smart TV).

In another aspect, the mobile computing device may generate the classifier model by observing behaviors on the mobile computing device related to the peripheral device over time and identifying a set of tests/evaluates features related to the peripheral device to include in the classifier model based on one or more behaviors on the mobile computing device that are expected to occur. In a further aspect, these expected behaviors may represent typical or benign behaviors and thus may be used as a reference point when classifying behaviors on the mobile computing device related to the peripheral device in the future as benign or undesirable (e.g., malicious or performance degrading).

In another aspect, the mobile computing device may identify a connected peripheral device and may request a classifier model from a server that tests/evaluations for features on the mobile computing device related to the peripheral device. For example, the mobile computing device may detect that an external, Bluetooth® speaker is attached, may request a classifier model from the server to account for the features related to the speaker, and may utilize the classifier model received from the server to begin monitoring behaviors on the mobile computing device related to the speaker that may cause malicious behavior on the mobile computing device and/or the speaker.

In another aspect, the mobile computing device may receive from the server a large or full classifier model that addresses features for various mobile computing devices. The behavior analyzer unit and/or a classifier unit operating on the mobile computing device may generate from the full classifier a lean classifier model that includes relevant features for monitoring malicious behavior on the device. The behavior analyzer unit on the mobile computing device may also identify and modify the lean classifier model to include tests/evaluations for one or more features determined to be related to a peripheral device connected to the mobile computing device, thereby enabling the behavior observer unit on the device to focus on observing, analyzing, and classifying behaviors of features on the mobile computing device related to the peripheral device that are particularly relevant to the performance of the mobile computing device.

In further aspects, a mobile computing device processor executing the behavior observer unit may observe behaviors on the mobile computing device related to the peripheral device and may retrieve additional, contextual behavior information directly from the peripheral device, such as via an API on the peripheral device configured for that purpose. For example, the behavior observer unit may directly access diagnostic information on an automotive peripheral device (e.g., speed, oil level, temperature, etc.). A mobile computing device processor(s) executing a behavior analyzer unit and/or a classifier unit may receive these observations (including the information received directly from the peripheral device) from the mobile computing device processor executing the behavior observer unit and may classify the ongoing behaviors on the mobile computing device related to the peripheral device based on these observations. In a further aspect, the behavior analyzer unit/classifier unit may optionally receive observations from a behavior observer unit operating on the peripheral device that may provide additional information regarding the state, configuration, performance, etc. of the peripheral device for use in analyzing/classifying behaviors on the mobile computing device related to the peripheral device.

In another aspect, the mobile computing device may be unable to directly obtain relevant behavior information from the peripheral device. In such an aspect, the behavior observer unit on the mobile computing device may indirectly obtain behavior information regarding the peripheral device's performance, configuration, activities, etc. by observing various communications between the peripheral device and the mobile computing device and/or by monitoring inputs received on the mobile computing device from the peripheral device. For example, the behavior observer unit may observe commands sent from the mobile computing device to an automotive peripheral device instructing the automotive peripheral device to increase its speed in excess of a predetermined speed limit, which may indicate that a process on the mobile computing device is performing malicious activities.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile computing devices 102, 103 (e.g., cell phones, laptops, tablets, etc.) and other network destinations, such as via telephone land lines (e.g., a POTS network, not shown) and the Internet 110. Communications between the mobile computing devices 102, 103 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include servers 116 connected to the telephone network 104 and to the Internet 110. The connection between the server 116 and the telephone network 104 may be through the Internet 110 or through a private network (as illustrated by the dashed arrows). The server 116 may also be implemented as a server within the network infrastructure of a cloud service provider network 118. Communication between the server 116 and the mobile computing devices 102, 103 may be achieved through the telephone network 104, the Internet 110, private network (not illustrated), or any combination thereof.

The mobile computing devices 102, 103 may be configured to communicate with, connect with, and/or utilize one or more peripheral devices, which may include digital cameras (e.g., a camera 122a), user input devices (e.g., an universal serial bus (USB) keyboard 122b, a Bluetooth® mouse input device, etc.), USB flash drives, external hard drives, smart televisions (e.g., a smart TV 122e), wearable devices (e.g., a smart watch 122c), automobiles, other mobile computing devices (e.g., mobile computing device 102, 103 over a wireless data link 124 and/or a wired data link 126), etc. For example, the mobile computing devices 102, 103 may connect to one or more of the peripheral devices 122a-122e over a wireless data link 124 and/or over a wired or persistent data link 126. The mobile computing devices 102, 103 may also be in communication with one or more peripheral devices through a direct, physical connection to the peripheral device. For example, the mobile computing device 102 may directly connect with a credit-card reader device 122d (e.g., a Square Reader® by Square, Inc.) when a plug on a credit-card reader device 122d is inserted into an audio port of the mobile computing device 102.

The server 116 may send classifier models (e.g., full or lean classifiers) to the mobile computing devices 102, 103, which may receive and use the classifier models to identify suspicious, malicious, or performance-degrading mobile computing device behaviors, software applications, processes, etc. that are related to one or more peripheral devices 122a-122e. The server 116 may also send classification and modeling information to the mobile computing devices 102, 103 to replace, update, create and/or maintain mobile computing device classification models related to those peripheral devices 122a-122e. In a further aspect, the mobile computing devices 102, 103 may be configured to use the collected behavioral, state, classification, modeling, success rate, and/or statistical information to generate, update or refine the classifier models (or data/behavior models) to include a further targeted and/or reduced subset of features related to one or more peripheral devices in the mobile computing devices 102, 103.

In another aspect, the mobile computing devices 102, 103 may receive and use full classifier models from the server 116 to generate lean classifier models that are suitable for use in identifying suspicious, malicious, or performance-degrading mobile computing device behaviors, software applications, processes, etc. occurring on the mobile computing device 102, 103 that are related to one or more peripheral devices 122a-122e.

Figure 2A:
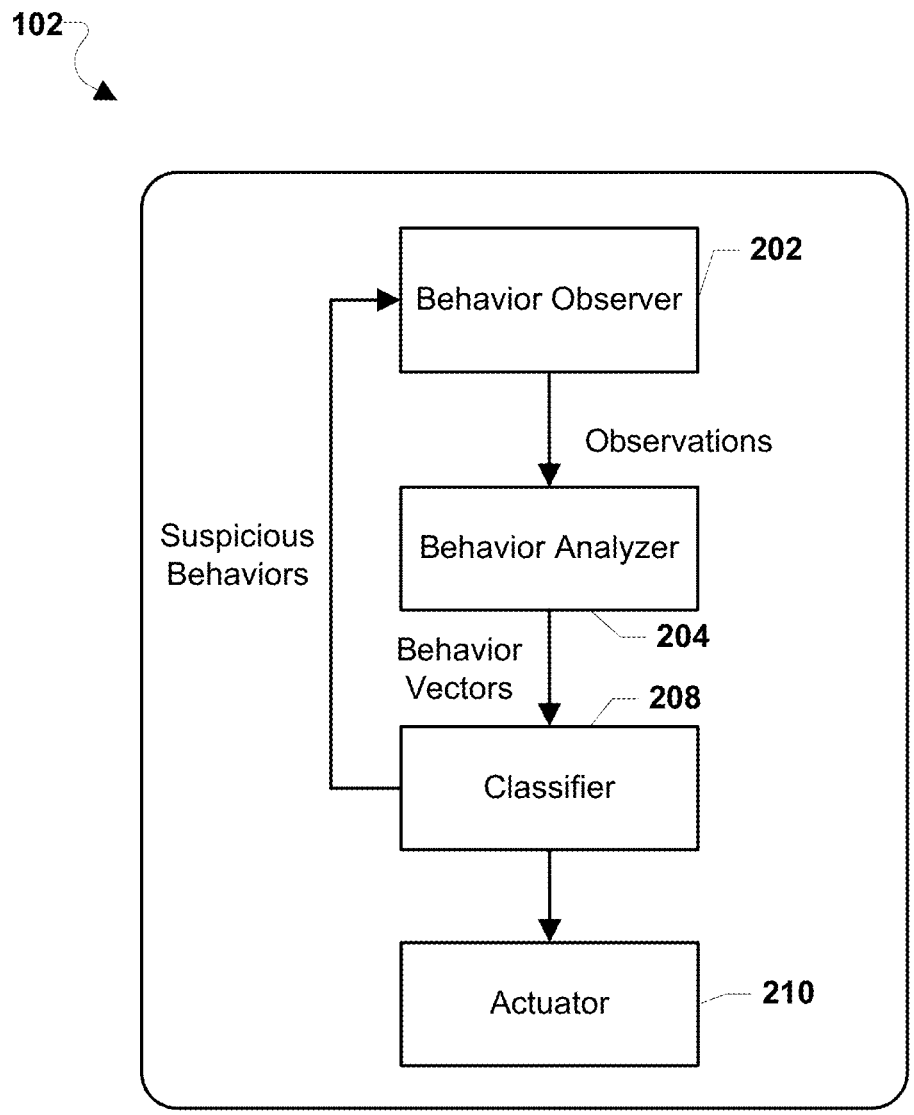
FIG. 2A is a block diagram illustrating example logical components and information flows in an aspect mobile computing device configured to determine whether a particular mobile computing device behavior is malicious, performance-degrading, suspicious, or benign.

FIG. 2A illustrates example logical components and information flows in an aspect mobile computing device 102 configured to determine whether a particular mobile computing device behavior, software application, or process is undesirable (e.g., malicious and/or performance-degrading), suspicious, or benign. In the example illustrated in FIG. 2A, the mobile computing device 102 includes a behavior observer unit 202, a behavior analyzer unit 204, a classifier unit 208, and an actuator unit 210. In an aspect, the classifier unit 208 may be implemented as part of the behavior analyzer unit 204. In an aspect, the behavior analyzer unit 204 may be configured to generate one or more classifier units 208, each of which may include one or more classifiers.

Each of the units 202-210 may be implemented in software, hardware, or any combination thereof. In various aspects, the units 202-210 may be implemented within parts of the operating system (e.g., within the kernel, in the kernel space, in the user space, etc.), within separate programs or applications, in specialized hardware buffers or processors, or any combination thereof. In an aspect, one or more of the units 202-210 may be implemented as software instructions executing on one or more processors of the mobile computing device 102.

The behavior observer unit 202 may be configured to instrument or coordinate application programming interfaces (APIs) at various levels/units of the mobile computing device, and monitor/observe mobile computing device operations and events (e.g., system events, state changes, etc.) at the various levels/units via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer unit 204.

The behavior observer unit 202 may monitor/observe mobile computing device operations and events by collecting information pertaining to library application programming interface (API) calls in an application framework or run-time libraries, system call APIs, file-system and networking sub-system operations, device (including sensor devices) state changes, and other similar events. The behavior observer unit 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer unit 202 may also monitor data network activity, which may include types of connections, protocols, port numbers, server/client that the device is connected to, the number of connections, volume or frequency of communications, etc. The behavior observer unit 202 may monitor phone network activity, which may include monitoring the type and number of calls or messages (e.g., SMS, etc.) sent out, received, or intercepted (e.g., the number of premium calls placed).

The behavior observer unit 202 may also monitor the system resource usage, which may include monitoring the number of forks, memory access operations, number of files open, etc. The behavior observer unit 202 may monitor the state of the mobile computing device, which may include monitoring various factors, such as whether the display is on or off, whether the device is locked or unlocked, the amount of battery remaining, the state of the camera, etc. The behavior observer unit 202 may also monitor inter-process communications (IPC) by, for example, monitoring intents to crucial services (browser, contracts provider, etc.), the degree of inter-process communications, pop-up windows, etc.

The behavior observer unit 202 may also monitor/observe driver statistics and/or the status of one or more hardware components, which may include cameras, sensors, electronic displays, Wi-Fi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer unit 202 may also monitor/observe one or more hardware counters that denote the state or status of the mobile computing device and/or mobile computing device sub-systems. A hardware counter may include a special-purpose register of the processors/cores that is configured to store a count or state of hardware-related activities or events occurring in the mobile computing device.

The behavior observer unit 202 may also monitor/observe actions or operations of software applications, software downloads from an application download server (e.g., Apple® App Store server), mobile computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth®, WiFi, etc.), content of text-based communications, content of recorded audio files, phonebook or contact information, contacts lists, etc.

The behavior observer unit 202 may monitor/observe transmissions or communications of the mobile computing device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer unit 202 may monitor/observe usage of and updates/changes to compass information, mobile computing device settings, battery life, gyroscope information, pressure sensors, magnet sensors, screen activity, etc. The behavior observer unit 202 may monitor/observe notifications communicated to and from a software application (AppNotifications), application updates, etc. The behavior observer unit 202 may monitor/observe conditions or events pertaining to a first software application requesting the downloading and/or install of a second software application. The behavior observer unit 202 may monitor/observe conditions or events pertaining to user verification, such as the entry of a password, etc.

The behavior observer unit 202 may also monitor/observe conditions or events at multiple levels of the mobile computing device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile computing device before establishing radio communication links or transmitting information, dual/multiple subscriber identity unit (SIM) cards, Internet radio, mobile phone tethering, offloading data for computations, device state communications, the use as a game controller or home controller, vehicle communications, mobile computing device synchronization, etc. Radio level observations may also include monitoring the use of radios (WiFi, WiMax, Bluetooth®, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device. For example, the mobile computing device processor may be configured to determine whether the phone is in a holster (e.g., via a magnet sensor configured to sense a magnet within the holster) or in the user's pocket (e.g., via the amount of light detected by a camera or light sensor). Detecting that the mobile computing device is in a holster may be relevant to recognizing suspicious behaviors, for example, because activities and functions related to active usage by a user (e.g., taking photographs or videos, sending messages, conducting a voice call, recording sounds, etc.) occurring while the mobile computing device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a universal serial bus (USB) power charging source, detecting that a keyboard or auxiliary device has been coupled to the mobile computing device, detecting that the mobile computing device has been coupled to a peripheral device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device, etc.

To reduce the number of factors monitored to a manageable level, in an aspect, the behavior observer unit 202 may perform coarse observations by monitoring/observing an initial set of behaviors or factors that are a small subset of all factors that could contribute to the mobile computing device's degradation. In an aspect, the behavior observer unit 202 may receive the initial set of behaviors and/or factors from a server 116 and/or a component in a cloud service or network 118. In an aspect, the initial set of behaviors/factors may be specified in data/behavior models received from the server 116 or cloud service/network 118. In an aspect, the initial set of behaviors/factors may be specified in a reduced feature model (RFMs).

The behavior analyzer unit 204 and/or classifier unit 208 may receive the observations from the behavior observer unit 202, compare the received information (i.e., observations) with contextual information received from the external units, and identify subsystems, processes, and/or applications associated with the received observations that are contributing to (or are likely to contribute to) the device's degradation over time, or which may otherwise cause problems on the device.

In an aspect, the behavior analyzer unit 204 and/or classifier unit 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer unit 204 may be configured to analyze information (e.g., in the form of observations) collected from various units (e.g., the behavior observer unit 202, external units, etc.), learn the normal operational behaviors of the mobile computing device, and generate one or more behavior vectors based the results of the comparisons. The behavior analyzer unit 204 may send the generated behavior vectors to the classifier unit 208 for further analysis.

The classifier unit 208 may receive the behavior vectors and compare them to one or more behavior units to determine whether a particular mobile computing device behavior, software application, or process is undesirable (e.g., performance degrading and/or malicious), benign, or suspicious.

In response to the classifier unit 208 determining that a behavior, software application, or process is malicious or performance-degrading, the classifier unit 208 may notify the actuator unit 210, which may perform various actions or operations to correct mobile computing device behaviors determined to be malicious or performance-degrading and/or perform operations to heal, cure, isolate, or otherwise fix the identified problem.

In response to the classifier unit 208 determines that a behavior, software application, or process is suspicious, the classifier unit 208 may notify the behavior observer unit 202, which may adjust the adjust the granularity of its observations (i.e., the level of detail at which mobile computing device behaviors are observed) and/or change the behaviors that are observed based on information received from the classifier unit 208 (e.g., results of the real-time analysis operations), generate or collect new or additional behavior information, and send the new/additional information to the behavior analyzer unit 204 and/or classifier unit 208 for further analysis/classification. Such feedback communications between the behavior observer unit 202 and the classifier unit 208 enable the mobile computing device 102 to recursively increase the granularity of the observations (i.e., make finer or more detailed observations) or change the features/behaviors that are observed until a source of a suspicious or performance-degrading mobile computing device behavior is identified, until a processing or battery consumption threshold is reached, or until the mobile computing device processor determines that the source of the suspicious or performance-degrading mobile computing device behavior cannot be identified from further increases in observation granularity. Such feedback communications also enable the mobile computing device 102 to adjust or modify the data/behavior models locally in the mobile computing device without consuming an excessive amount of the mobile computing device's processing, memory, or energy resources.

In an aspect, the behavior observer unit 202 and the behavior analyzer unit 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer unit 202 enables the mobile computing device 102 to efficiently identify and prevent problems from occurring on mobile computing devices without requiring a large amount of processor, memory, or battery resources on the device.

Figure 2B:
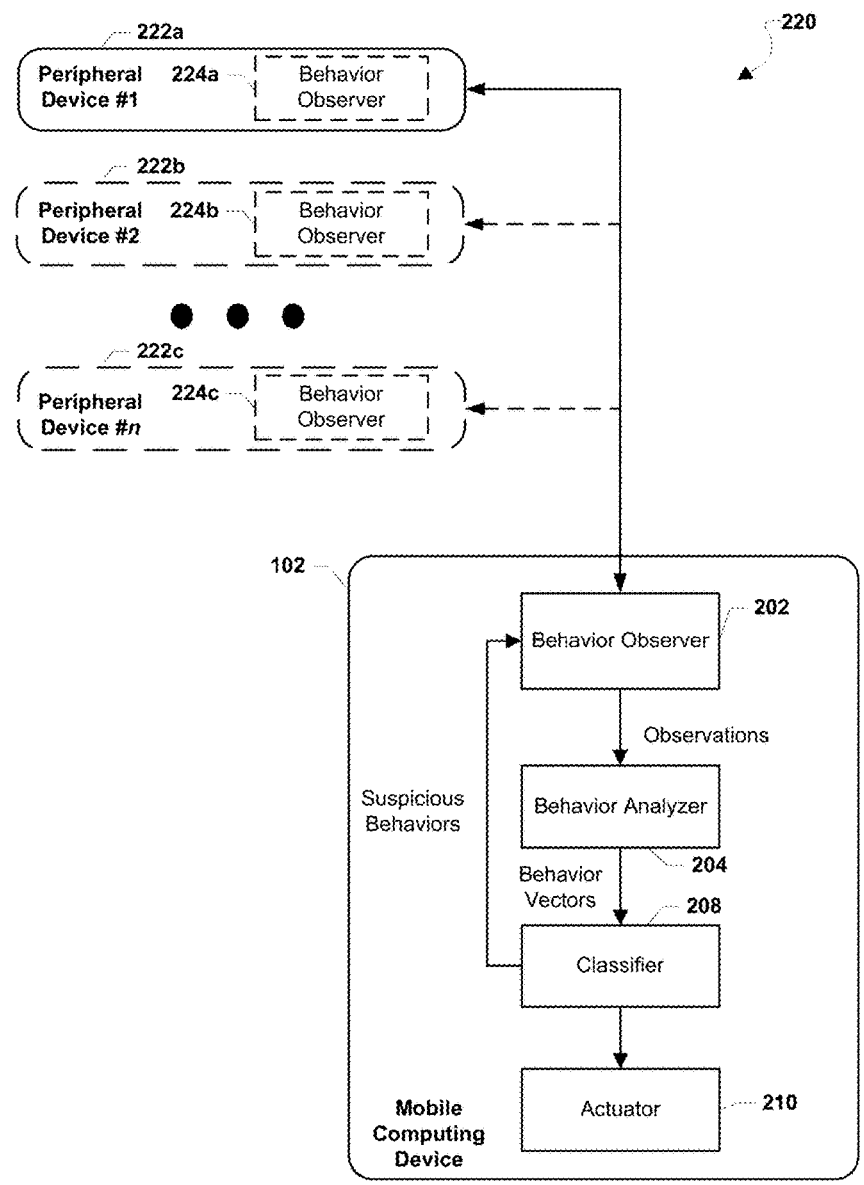
FIG. 2B is a block diagram illustrating example logical components and information flows in an aspect system that includes one or more peripheral devices connected to an aspect mobile computing device configured to determine whether a particular mobile computing device behavior related to the one or more peripheral devices is malicious, performance-degrading, suspicious, or benign.

FIG. 2B illustrates example logical components and information flows in a system including an aspect mobile computing device 102 in communication with one or more peripheral devices 222a-222c. As described above with reference to FIG. 2A, the mobile computing device 102 may be configured to determine whether a particular mobile computing device behavior, software application, or process on the mobile computing device 102 is undesirable (e.g., malicious and/or performance degrading), suspicious, or benign.

As described above, the mobile computing device 102 may gain additional or enhanced functionalities/features/capabilities by connecting to one or more peripheral devices 222a-222c. For example, when peripheral device 222a (e.g., a credit-card reader device) is inserted directly into a mobile computing device 102, the mobile computing device 102 may gain the ability to read credit card information from credit cards and the ability to facilitate credit card transactions by forwarding the credit card information to a third party financial institution.

Thus, in further aspects, because connecting to one or more peripheral devices 222a-222c may expand the capabilities of the mobile computing device 102 and/or enable to mobile computing device 102 to control the peripheral devices 222a-222c, the behavior observer unit 202 operating on the mobile computing device 102 may be configured to begin monitor/observe features/behaviors on the mobile computing device 102 related to these expanded capabilities to ensure that these behaviors occurring on the mobile computing device 102 are secure and not malicious or performance degrading. In the above example, the behavior observer unit 202 may be configured to begin monitoring behaviors on the mobile computing device 102 related to reading numbers from credits cards on the credit-card reader device and sending those credit card numbers to the Square Inc. website for processing.

In another example, the mobile computing device 102 may be connected to a peripheral device 222b (e.g., a smart TV) and may gain additional capabilities relative to the peripheral device 222b, such as the ability to remotely change channels on the peripheral device 222b using a smart-TV application executing on the mobile computing device 102. In this example, the behavior observer unit 202 may monitor behaviors on the mobile computing device related to controlling and/or communicating with the peripheral device 222b to ensure that applications or processes operating on the mobile computing device 102 are not causing the peripheral device 222b to experience undesirable behavior (e.g., causing the smart TV to display unwanted advertisements).

In an aspect, the behavior observer unit 202 may make behavior observations and/or obtain information related to the one or more peripheral device 222a-222c via APIs provided by the peripheral devices 222a-222c. For example, the API may be provided in an application for the peripheral device 222a that is received on the mobile computing device 102 (e.g., via download from the Internet or via direct installation from the peripheral device). The APIs may enable the behavior observer unit 202 to directly gather additional information that may be useful in analyzing/classifying behaviors occurring on the mobile computing device that are related to the peripheral devices 222a-222c. Thus, by using the specialized APIs, the behavior observer unit 202 may be able to gather a wide range of information related to the peripheral device for use in detecting undesirable behavior on the mobile computing device 102 (e.g., malicious behavior and/or performance-degrading behavior).

In another aspect, the one or more peripheral devices 222a-222c may each optionally include a behavior observer unit (e.g., behavior observers 224a-224c) that may be configure to function in a manner substantially similar to the behavior observer unit 202 operating on the mobile computing device. Thus, the behavior observers 224a-224c may be configure to monitor various behaviors, processes, communications, etc. occurring on the peripheral device and may be configured to send those observations to the behavior observer unit 202 on the mobile computing device 102. For example, the behavior observers 224a-224c may utilize APIs or other components on their respective peripheral devices 222a-222c to extract various types of information that may be relevant in classifying behavior on the mobile computing device 102 related to those peripheral devices 222a-222c. In such an aspect, the behavior observer unit 202 may send its observations and the observations received from the behavior observers 224a-224c to the behavior analyzer unit 204 and/or classifier unit 208 to determine whether the observations indicate whether undesirable behavior related to the peripheral device is occurring on the mobile computing device 102.

In another aspect, the behavior observer unit 202 may be configured to generate observations related to the peripheral device based on inputs received from the peripheral devices 222a-222c and/or communications exchanged between the peripheral devices 222a-222c and the mobile computing device 102. For example, the behavior observer unit 202 may observe the output from a peripheral device 222a over a period of time and may send these observations to the behavior analyzer unit 204 to determine whether the peripheral device 222a has sent certain output that may indicate undesirable behavior related to the peripheral device is occurring on the mobile computing device 102. In another example, the behavior observer unit 202 may monitor communications sent from the mobile computing device 102 to a peripheral device 222c (e.g., a car) and may observe that the mobile computing device 102 is instructing the peripheral device 222c to greatly exceed a typical or expected speed when performing a parking maneuver As described above with reference to FIG. 2A, the behavior observer unit 202 (and optionally the behavior observers 224a-224c) may send their behavioral observations to the behavior analyzer unit 204 and/or the classifier unit 208. The behavior analyzer unit 204 may generate a behavior vector based on these observations and may apply the generated behavior vector to a classifier model that tests/classifies the features on the mobile computing device 102 related to one or more peripheral devices 222a-222c connected to the mobile computing device 102. The behavior analyzer unit 204 and/or the classifier unit 208 may also classify the mobile computing device behaviors as malicious, performance degrading, benign, or suspicious based on the application of the behavior vector to the classifier model as described above with reference to FIG. 2A.

Figure 3:
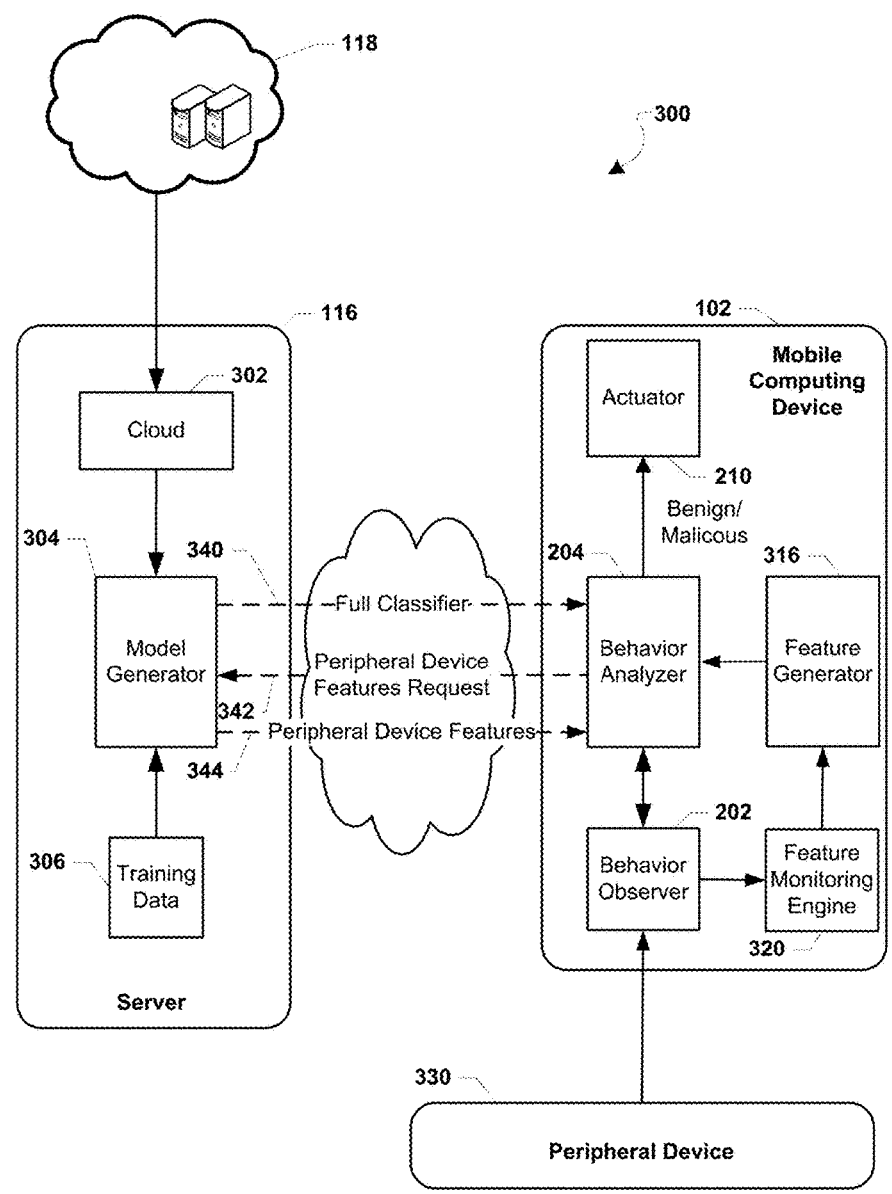
FIG. 3 is a block diagram illustrating example components and information flows in an aspect system that includes a server configured to work in conjunction with a mobile computing device in communication with a peripheral device to generate a classifier model and use the classifier model to determine whether a particular mobile computing device behavior related to the peripheral device is malicious, performance-degrading, suspicious, or benign.

FIG. 3 illustrates example components and information flows in an aspect system 300 that includes a mobile computing device 102 configured to work in conjunction with a server 116 to intelligently and efficiently identify actively malicious or poorly written software applications and/or suspicious or performance-degrading mobile computing device behaviors related to one or more peripheral devices connected to the mobile computing device 102 without consuming an excessive amount of processing, memory, or energy resources of the mobile computing device.

In the example illustrated in FIG. 3, the server 116 includes a cloud unit 302, a model generator 304 unit, and a training data unit 306. The mobile computing device 102 includes a behavior observer unit 202, a behavior analyzer unit 204, an actuator unit 210, a feature generator unit 316, and a feature monitoring engine 320. In various aspects, the feature generator unit 316 and/or the feature monitoring engine 320 may be included, or implemented as part of, the behavior analyzer unit 204 or as part of a classifier unit 208 (not illustrated in FIG. 3).

The cloud unit 302 may be configured to receive a large amount of information from a cloud service/network 118 that includes all or most of the features, data points, and/or factors that could contribute to the mobile computing device 102's degradation over time, including features that may be present on/related to a peripheral device 330 connected to the mobile computing device 102.

The model generator 304 may use the information received in the cloud unit 302 and training data (e.g., via the training data unit 306) to generate a full or robust classifier model that includes or identifies all or most of the features, data points, and/or factors that could contribute to degradation of the mobile computing device 102 over time.

In various aspects, the server 116 may be configured to generate the full classifier model by performing, executing, and/or applying machine learning and/or context modeling techniques to behavior information and/or the results of behavior analyses provided by many mobile computing devices or other information received from the cloud service/network 118. Thus, the server 116 may receive a large number of reports from a plurality of mobile computing devices and analyze, consolidate or otherwise turn such crowd-sourced information into useable information, particularly behavior models that may be used or accessed by all mobile computing devices. The server 116 may continuously reevaluate existing behavior models as new behavior/analysis reports are received from mobile computing devices, and/or generate new or updated behavior models based on historical information (e.g., collected from prior executions, previous applications of behavior models, etc.), new information, machine learning, context modeling, and detected changes in the available information, mobile computing device states, environmental conditions, network conditions, mobile computing device performance, battery consumption levels, etc.

In an aspect, the model generator 304 may generate the full classifier model to include a finite state machine representation, such as a boosted decision stump or family of boosted decision stumps that can be quickly and efficiently culled, modified or converted into lean classifier models that are suitable for use or execution in a mobile computing device processor. The finite state machine expression or representation may be an information structure that includes test conditions, state information, state-transition rules, and other similar information. In an aspect, the finite state machine expression or representation may be an information structure that includes a large or robust family of boosted decision stumps that each evaluate or test a condition, feature, factor, or aspect of a behavior of the mobile computing device.

In an aspect, the model generator 304 unit may send the full classifier unit to the mobile computing device 102 (e.g., via a transmission 340) which may be configured to generate lean data/behavior models based on the full model generated in the cloud unit 302. In an aspect, the mobile computing device 102 may be configured to use the full classifier model to generate a family of lean classifier models of varying levels of complexity (or "leanness"). Further, generating the lean data/behavior models may include generating one or more reduced feature models (RFMs) that include a subset of the features and data points included in the full model generated in the server 116. In another aspect, the mobile computing device may generate a lean data/behavior model that includes an initial feature set (e.g., an initial reduced feature model) that includes information determined to have a highest probability of enabling the behavior analyzer unit 204 to conclusively determine whether a particular mobile computing device behavior is benign or undesirable (e.g., malicious and/or performance degrading).

In an aspect, the mobile computing device 102 may be configured to cull a family of boosted decision stumps included in the full classifier model received from the server 116 to generate a lean classifier model that includes a reduced number of boosted decision stumps and/or evaluates a limited number of test conditions. This culling of the full boosted decision stumps classifier model may be accomplished by: selecting a boosted decision stump; identifying all other boosted decision stumps that depend upon the same mobile computing device-specific state, feature, behavior, or condition as the selected decision stump (and thus can be applied based upon one determination result); including in the lean classifier model the selected and all identified other boosted decision stumps that depend upon the same mobile computing device-specific state, feature, behavior, or condition; and repeating the process for a limited number of selected boosted decision stumps not already included in the lean classifier model. In this manner, a lean classifier model may be generated that includes all boosted decision stumps that depend upon a limited number of different states, features, behaviors, or conditions. The mobile computing device may then use this locally generated lean classifier model to quickly classify a mobile computing device behavior without consuming an excessive amount of its processing, memory, or energy resources.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Stumps are efficient because they are very simple and primal (and thus do not require significant processing resources). Stumps are also very parallelizable, and thus many stumps may be applied in parallel/at the same time (e.g., by multiple cores or processors in the mobile computing device).

In an aspect, a behavior analyzer unit 204 of the mobile computing device 102 may generate lean classifier models in the form of decision stumps without accessing training data on the server 116 (e.g., from training data unit 306), thereby eliminating the requirement for the feedback communications between mobile computing device 102 to the server 116. In other words, the behavior analyzer unit 204 may generate and apply lean classifier models without communicating with the cloud or a network to re-train the data, which significantly reduces the mobile computing device's dependence on the cloud (and thus improves performance and power consumption characteristics of the mobile computing device). The behavior analyzer unit 204 may also use boosted decision stumps to classify computing device behavior to identify malicious or performance-degrading behavior.

In an aspect, the mobile computing device may be configured to perform "joint feature selection and pruning" operations that allow the mobile computing device to: generate lean classifier models on-the-fly without needing access to cloud training data, dynamically reconfigure the classifiers per application to enhance the classification accuracy, and specify a deterministic complexity for each classifier (e.g., O(# of stumps)).

In an aspect, the "joint feature selection and pruning" operations may include performing feature selection operations. For example, the behavior analyzer unit 204 may determine that it needs to generate a lean classifier model that tests 2 unique features (e.g., F1 and F3), in which case the feature selection operations may include traversing a list of 100 boosted decision stumps until the first 2 unique features (e.g., F1 and F3) are discovered.

The behavior analyzer unit 204 may then test only the features identified by the feature selection operations (e.g., F1 and F3), which may be accomplished by traversing the entire list of 100 boosted decision stumps and deleting any stump that tests a different feature/condition (e.g., F5). The remaining boosted decision stumps (i.e., stumps that tests conditions "F1" and "F3") may be used as a lean classifier model without re-training the data. The behavior analyzer unit 204 may apply the behavior information (e.g., in the form of a behavior vector) to each of the remaining boosted decision stumps, compute a weighted average of all the answers received from the remaining stumps, and use the weighted average to determine if a mobile computing device behavior is undesirable or benign.

Once the boosted decision stumps have been generated through the feature selection and pruning process, the behavior analyzer unit 204 may use selected decision stumps as a behavior model that the behavior analyzer unit 204 may compare against current device states, settings and behaviors. Since decision stumps are binary tests that are independent, the behavior analyzer unit 204 may perform the behavior analysis process of comparing observed behaviors, which may be summarized in a behavior vector, to the model in parallel. Also, since the stumps are very simple (basically binary), the processing to perform each stump may be very simple and thus may be accomplished quickly with less processing overhead. Because each decision stump yields an answer with a weight value, the behavior analyzer unit 204's ultimate decision regarding whether behaviors are undesirable or benign may be determined as the weighted sum of all the results, which may also be a simple calculation.

Thus, in an aspect, the behavior analyzer unit 204 may generate a behavior vector from observations of on-going behaviors on the mobile computing device 102 received from a behavior observer unit 202, and the behavior analyzer unit 204 may apply the behavior vector to boosted decision stumps to determine whether the on-going behaviors on the mobile computing device 102 are undesirable or benign.

In further aspects, the behavior analyzer unit 204 may modify lean classifier models generated as a result of performing the joint feature selection and pruning operations to incorporate/account for features on the mobile computing device 102 related to a peripheral device 330 connected to the mobile computing device 102.

In an aspect, the lean classifier models that the behavior analyzer unit 204 initially generates from the large classifier model received from the server 116 may not adequately represent the features and behaviors related to the peripheral device 330. For example, the large classifier model received from the server 116 may only include a small number of behavior vectors/models related to biometric sensors. Because the mobile computing device 102 may not include biometric sensors, the behavior analyzer unit 204 may initially generate a lean classifier model without regard to those biometric sensor features. However, if the mobile computing device 102 connects to a peripheral device 330 that enables the mobile computing device 102 to receive and utilize biometric data, those new biometric sensor features on the mobile computing device 102 may now be highly relevant in conducting certain financial transactions (e.g., Google Wallet), and it may be highly desirable to include those biometric sensor features in the lean classifier model in order to detect malicious or performance-degrading activity on the mobile computing device 102 related to the biometric sensor features that could have significant financial implications (e.g., sending credit card information to a hacker). Thus, the mobile computing device 102 and/or the peripheral device 330 connected to the mobile computing device 102 may benefit from increased vigilance of behaviors related to the peripheral device 330 occurring on the mobile computing device 102.

In another aspect, the behavior analyzer unit 204 may learn of features to include in the classifier model related to the peripheral device 330 connected to the mobile computing device 102 from a feature generator unit 316 operating on the mobile computing device 102. In an aspect, the feature generator unit 316 may be implemented separately or as a part of the behavior analyzer unit 204. The feature generator unit 316 may be in communication with a feature monitoring engine 320 configured to monitor for changes in the mobile computing device's functionality/capabilities, such as when the mobile computing device 102 connects to a peripheral device.

In response to detecting that a peripheral device 330 has connected to the mobile computing device 102, the feature monitoring engine 320 may alert the feature generator unit 316, and the feature generator unit 316 may determine the new or modified features on the mobile computing device 102 related to that peripheral device 330. For example, the mobile computing device 102 may gain the ability to receive biometric data from a pacemaker peripheral device after wirelessly connecting to that device, and the feature generator unit 316 may identify one or more features, conditions, test, etc. related to receiving the biometric data. The feature generator unit 316 may also signal the behavior analyzer unit 204 to account for the features associated with the new or expanded mobile computing device capabilities in the classifier model used by the behavior observer unit 202 to monitor for undesirable behavior on the mobile computing device 102 (e.g., malicious and/or performance-degrading behavior). Thus, by modifying or updating the lean classifier models derived from the large classifier model as the mobile computing device 102 connects to one or more peripheral devices, the behavior analyzer unit 204 may ensure that important features on the mobile computing device 102 related to those peripheral devices are included in the lean classifier model and, thus, monitored for undesirable behavior.

In another aspect, the feature generator unit 316 and/or the behavior analyzer unit 204 may detect and identify a peripheral device 330 that connects to the mobile computing device 102 and may send a request 342 (labeled in FIG. 3 as "Peripheral Device Features Request") for tests, classifiers, information, etc. for features related to the peripheral device 330 from a server 116. In response to receiving the request, the server 116 may access a cloud data set and may send a response transmission 344 (labeled in FIG. 3 as "Peripheral Device Features") that includes classification information, tests, etc. for one or more mobile computing device features related to the peripheral device 330.

Figure 4:
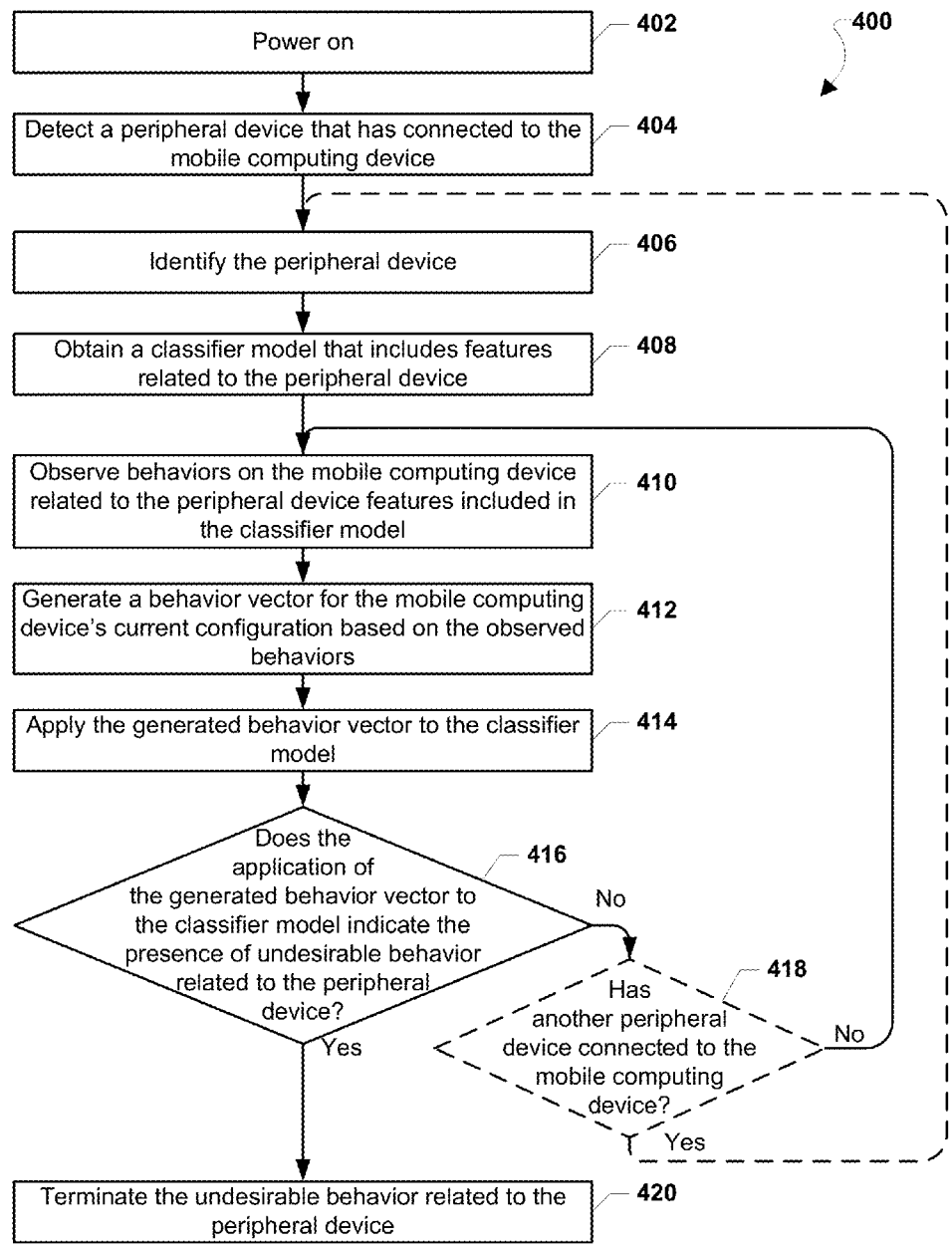
FIG. 4 is a process flow diagram illustrating an aspect method of obtaining classifier models on a mobile computing device that include features related to a peripheral device connected to the mobile computing device.

FIG. 4 illustrates an aspect method 400 implemented by one or more processors on a mobile computing device for generating a classifier model that takes into account features related to a peripheral device connected to the mobile computing device. To ensure that the classifier model includes features or other information related to the peripheral device that will enable the mobile computing device to detect undesirable behavior occurring on the mobile computing device, one or more processors on the mobile computing device may perform the following operations, starting when the mobile computing device powers up in block 402.

In block 404, the processor executing the feature monitoring engine may detect a peripheral device that has connected to the mobile computing device, such as by scanning the mobile computing device to identify a peripheral device that is or that has just connected to the mobile computing device. For example, the processor executing the feature monitoring engine may receive a signal from the kernel space when a wireless or wired connection (e.g., a Bluetooth® connection) has been established with a peripheral device.

The processor executing the feature generator may identify the peripheral device connected to the mobile computing device in block 406. For example, the processor executing the feature generator may request and/or receive an identification message from the peripheral device via an API hosted on the peripheral device (e.g., via plug-and-play detection), identify the peripheral device based on an evaluation of the capabilities and features present on the peripheral device or based on user input identifying the peripheral device, and/or implement other techniques for identifying and communicating with a peripheral device.

In block 408, the processor executing the behavior analyzer unit may obtain a classifier model that tests/evaluates/classifies behaviors of features related to the peripheral device for use in detecting undesirable behavior on the mobile computing device. In an aspect, the processor executing the behavior analyzer unit may obtain the classifier model by determining the new/expanded capabilities available on the mobile computing device as a result of connecting to the peripheral device and generating a classifier model that tests the behavior of features related to the mobile computing device's new/expanded capabilities as further described below with reference to FIG. 5. In another aspect, the processor executing the behavior analyzer unit may obtain a classifier model that tests the behavior of features on the mobile computing device related to the peripheral device by generating a set of features and/or data points based on behaviors related to the peripheral device that are expected to occur as further described below with reference to FIG. 6. The processor executing the behavior analyzer unit may also obtain a classifier model by requesting classifier information for features related to the identified peripheral device from a server as further described below with reference to FIG. 7A. In another aspect, the processor executing the behavior analyzer unit may obtain a classifier model that tests the behavior of features related to the peripheral device by modifying a lean classifier model generated from a full classifier received from the server to include such features as further described below with reference to FIG. 8.

In block 410, the processor executing the behavior observer unit may observe behaviors on the mobile computing device related to the peripheral device features included/described in the classifier model obtained in block 408. As described above with reference to FIGS. 2A and 2B, the processor executing the behavior observer unit may receive observations, data, signals, measurements, readings, and/or various other types of information regarding features related to the peripheral device. In an aspect, the processor executing the behavior observer unit may observe these behaviors related to the peripheral device by collecting information directly from the peripheral device (e.g., from a behavior observer unit included on the peripheral device or via a specifically-configured API for that purpose) as further described below with reference to FIG. 9. In another aspect, the processor executing the behavior observer unit may observe behaviors on the mobile computing device related to the peripheral device by gathering information indirectly from the peripheral device based on communications between the peripheral device and the mobile computing device and/or based on inputs received on the mobile computing device from the peripheral device as further described below with reference to FIG. 10.

In block 412, the processor executing the behavior analyzer unit may generate a behavior vector for the mobile computing device's current configuration based on the behaviors observed in block 410 as generally described above with reference to FIGS. 2A and 2B. Thus, in an aspect, the processor executing the behavior analyzer unit may receive observations of behaviors of features related to the peripheral device from the behavior observer units operating on one or both of the mobile computing device and/or the peripheral device.

In block 414, the processor executing the classifier unit and/or the processor executing the behavior analyzer unit may apply the generated behavior vectors to the classifier model that includes the features related to the peripheral device, such as by applying the generated behavior vectors to boosted decision stumps describing the features related to the peripheral device. In an aspect, the processor(s) executing the classifier unit and/or the behavior analyzer unit may apply values in the behavior vector representing a particular feature related to the peripheral device to one or more boosted decision stumps that test that particular feature. The results of applying the behavior vector values to an boosted decision stump is a binary outcome, such as "yes" or "no," with each outcome assigned a weighted probability indicating a confidence factor that the behavior of the feature related to the peripheral device is benign or undesirable (e.g., malicious or performance degrading).

For example, the processor executing the behavior classifier unit may test a remote-parking feature on the mobile computing device related to causing an automotive peripheral device to park without direct driver input. The processor executing the behavior classifier unit may apply a behavior vector value for the remote-parking feature to resolve boosted decision stumps related to that feature. The boosted decision stumps associated with the remote-parking feature may include the tests of whether "the automotive peripheral device is moving faster than 15 miles per hour," "the automotive peripheral device is moving faster than 10 miles per hour," "the automotive peripheral device is moving faster than 5 miles per hour," etc. Each resolution for a boosted decision stump test may produce a certain weighted probability that the behavior of the remote-parking feature of the mobile computing device is undesirable or benign, and the processor(s) executing the behavior classifier and/or the behavior analyzer unit may combine the weighted probabilities to determine whether behaviors related to the peripheral device are undesirable or benign and a certain confidence of that conclusion (e.g., the current configuration is benign with a 35% confidence).

In determination block 416, the processor(s) executing the behavior analyzer unit and/or the classifier unit may determine whether the application of the behavior vector generated in block 414 to the classifier model that includes features related to the peripheral device indicate the presence of undesirable behavior related to the peripheral device on the mobile computing device. In an aspect, the application of the generated behavior vector to the classifier model including the features related to the peripheral device may indicate whether malicious and/or performance-degrading behavior on the mobile computing device is negatively affecting the peripheral device, whether malicious and/or performance-degrading behavior on the peripheral device is negatively affecting the mobile computing device, and/or whether malicious and/or performance-degrading behavior on both of the peripheral device and the mobile computing device is negatively affecting one or both of those devices.

In the above example, the processor(s) executing the behavior analyzer unit and/or the classifier unit may determine with a high certainty that behaviors related to the automotive peripheral device are very likely to be malicious when the mobile computing device is instructing the automotive peripheral device to move faster than 15 miles per hour when the safe and/or expected speed for the automotive peripheral device to perform a remote-parking operation is 3-5 miles per hour.

In response to the processor(s) executing the behavior analyzer unit and/or the classifier unit determining that the application of the generated behavior vector to the classifier model indicates the presence of undesirable behavior related to the peripheral device occurring on the mobile computing device (i.e., determination block 416="Yes"), the processor executing the actuator may terminate the undesirable behaviors on the mobile computing device related to the peripheral device in block 420. To terminate the undesirable behavior, the processor executing the actuator may restrict access to the feature related to the offending behavior, or identify the element responsible for the malicious/performance-degrading behavior and quarantine, delete, or cure that element. Thus, in the above example, the processor executing the actuator unit may determine that a process or application operating on the mobile computing device is sending malicious instructions to automotive peripheral device to move at unsafe speeds and may terminate that process or application or may modify the malicious instruction to ensure that the automotive peripheral device does not exceed a safe speed.

In response to the processor(s) executing the behavior analyzer unit and/or the classifier unit determining that the application of the generated behavior vector to the classifier model does not indicate the presence of undesirable behavior related to the peripheral device (i.e. determination block 416="No"), one or more processors on the mobile computing device may repeat the operations described above in a loop starting in block 410 by observing behaviors on the mobile computing device related to the peripheral device.

In an optional aspect, a processor on the mobile computing device executing the feature monitoring engine may determine whether another peripheral device has connected to the mobile computing device in optional determination block 418. For example, peripheral devices may be occasionally connected to the mobile computing device, thereby expanding the features and capabilities related to those peripheral devices that are available to the mobile computing device and that may lead to malicious or performance-degrading behavior. In response to a processor executing the feature monitoring engine determining that another peripheral device has not connected to the mobile computing device (i.e., optional determination block 418="No"), the one or more processors on the mobile computing device may repeat the operations described above in a loop starting in block 410 by observing behaviors on the mobile computing device related the peripheral device features included in the classifier unit obtained in block 408.

In response to the processor executing the feature monitoring engine determining that another peripheral device has connected to the mobile computing device (i.e., optional determination block 418="Yes"), the one or more processors on the mobile computing device may repeat the operations described above in a loop by identifying the another peripheral device that has connected to the mobile computing device in block 406.

Figure 5:
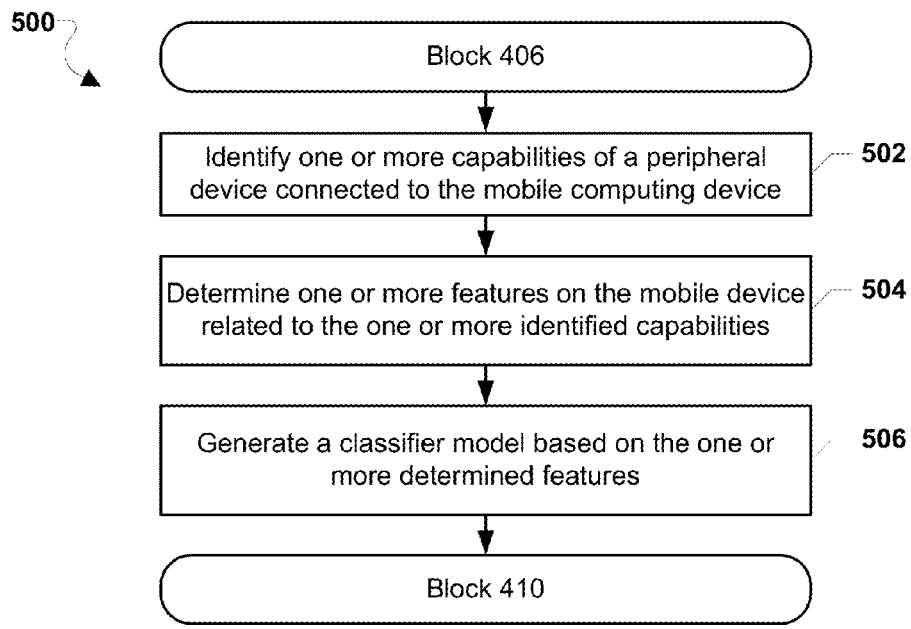
FIG. 5 is a process flow diagram illustrating an aspect method of generating a classifier model that includes one or more features related to a peripheral device based on the peripheral device's capabilities.

FIG. 5 illustrates an aspect method 500 that may be implemented by one or more processors on a mobile computing device for generating a classifier model based on one or more capabilities determined to be present on a peripheral device connected to the mobile computing device. The operations of method 500 implement an aspect the operations of block 408 of method 400 described above with reference to FIG. 4, and may begin after the processor executing the feature generator unit identifies the peripheral device in block 406 of method 400.

As discussed above, the features/capabilities of the mobile computing device may change dynamically as features relative to peripheral devices are added and removed during normal operation of the mobile computing device. For example, the mobile computing device may establish a connection with a smart watch peripheral device capable of initiating calls on the mobile computing device. In light of the dynamic nature of features on the mobile computing device related to peripheral devices, the classifier model used to detect malicious/performance-degrading behavior on the mobile computing device may need to account for new/expanded features on the mobile computing device related to peripheral devices that connect to the mobile computing device in order to prevent performance and security issues related to those peripheral devices.

In block 502, the processor executing the feature generator unit may identify one or more capabilities of the peripheral device identified in block 406 of method 400, such as by scanning the peripheral device, requesting information from the peripheral device, or through various other known mechanisms (e.g., by utilizing the peripheral device's plug-and-play capabilities). In an aspect, the processor executing the feature generator unit may also determine the capabilities related to the peripheral device based solely on the identity of the peripheral device. For example, when the processor executing the feature generator determines that the identified peripheral device is a Bluetooth® speaker, the processor may determine that the speaker is capable of receiving audio signals, converting those audio signals into audible sound, and playing out the audible sound.

In block 504, the processor executing the feature generator unit may also determine one or more features on the mobile computing device related to the one or more capabilities of the peripheral device identified in block 502. In the above example, the processor executing the feature generator may determine that the mobile computing device may now be able to send audio signals to the speaker for play out and thus may have a "remote-audio-playout" feature based on the Bluetooth® speaker's ability to generate audible sound from audio signal inputs.

In block 506, the processor executing the behavior analyzer unit may generate a classifier model based on the one or more features on the mobile computing device determined in block 504. In an aspect, the processor executing the behavior analyzer unit may train a corpus of data with the determined features to develop the classifier model that tests, evaluates, and/or classifies behaviors related to those determined features. In another aspect, the processor executing the behavior analyzer unit may generate the classifier model from a full classifier received from a server that includes the determined features (i.e., the processor may generate a "lean" classifier that includes the features determined in block 504).

The process may continue in block 410 as the processor executing the behavior observer unit may observe behaviors on the mobile computing device related to the peripheral device features included in the classifier model generated in block 506.

Figure 6:
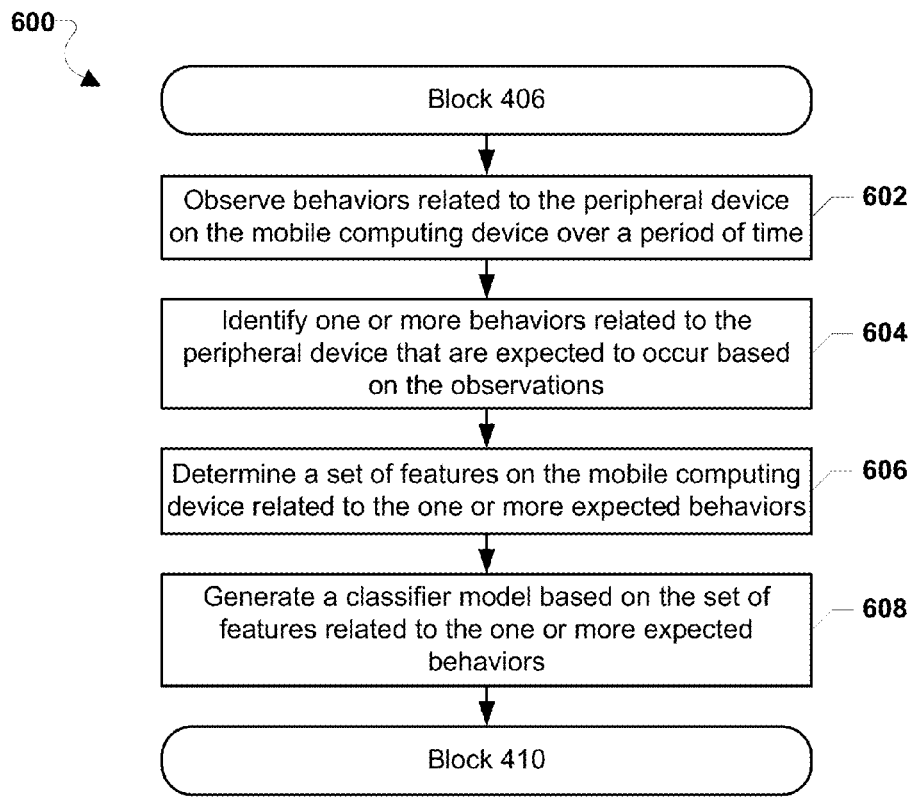
FIG. 6 is a process flow diagram illustrating an aspect method of generating a classifier model that includes one or more features related to a peripheral device by identifying one or more behaviors on the mobile computing device related to the peripheral device that are expected to occur.

FIG. 6 illustrates an aspect method 600 that may be implemented by one or more processors operating on a mobile computing device for generating a classifier model based on one or more behaviors expected to occur on the mobile computing device that are related to the peripheral device.

In an aspect, the components operating on the mobile computing device may be unable to immediately generate a classifier model for a peripheral device that has connected to the mobile computing device, especially when the peripheral device is an older device or a relatively simple device that may not have the ability to communicate a wide range of information regarding its capabilities to the mobile computing device. For such "legacy" devices, one or more processors on the mobile computing device may be configured to observe various activities, features, capabilities, functionality, communications, etc. on the mobile computing device that are related to the peripheral device, and the one or more processors may derive a classifier model useful in testing feature on the mobile computing device related to the peripheral device based on expected actions, activities, trends, patterns, etc. occurring on and between the mobile computing device and the peripheral device. In other words, when the peripheral device is unable to directly communicate information regarding its capabilities and/or features, the processors operating on the mobile computing device may generate a classifier model that includes features related to the peripheral device by indirectly determining how the mobile computing device and the peripheral device interact and what behaviors occurring on one or both of the mobile computing device and the peripheral device are expected and non-malicious/non-performance degrading.

The operations of method 600 implement an aspect of the operations of block 408 of method 400 described above with reference to FIG. 4 and may begin after the processor executing the feature generator unit identifies the peripheral device in block 406 of method 400.

In block 602, the processor executing the feature generator unit may observe behaviors on the mobile computing device related to the peripheral device over a period of time. In an aspect, the processor may monitor interactions and communications between the mobile computing device and the peripheral device, outputs from the peripheral device, and/or instructions sent from the mobile computing device to the peripheral device. For example, the processor executing the feature generator unit may observe credit card data sent from a credit-card reader device to the mobile computing device and may observe that credit card data is consistently sent from the mobile computing device to the same website.

Thus, in block 604, the processor executing the feature generator unit may identify one or more behaviors on the mobile computing device related to the peripheral device that are expected to occur based on the observations made in block 602. In an aspect of the operations performed in block 604, the processor executing the feature generator unit may identify these one or more expected behaviors by detecting patterns of actions, inputs, outputs, communications, etc. In another aspect, the processor executing the feature generator unit may infer behaviors that are expected to occur based on the capabilities of the peripheral device (i.e., what the peripheral device should and should not be capable of doing and/or what the mobile computing device should and should not be allowed to do with the peripheral device). For example, the processor executing the feature generator unit may determine that a fingerprint scanner peripheral device connected to the mobile computing device should not be able (or allowed) to cause the mobile computing device to secretly transmit data to an unknown website.

In block 606, the processor executing the behavior analyzer unit may determine a set of features on the mobile computing device related to the one or more expected behaviors identified in block 604, such as a "credit-card reader" feature related to sending credit card data from the mobile computing device to a particular website after a credit card is swiped through the credit-card reader peripheral device. In other words, the processor executing the behavior analyzer unit may identify the features to be monitored/observed on the mobile computing device based on a detailed understanding of what behaviors related to the peripheral device are expected to occur on the mobile computing device. In a further aspect, the processor executing the behavior analyzer unit may determine various tests for the features related to the one or more expected behaviors (e.g., in the form of boosted decision stumps) based on the observations of those features.

The processor(s) executing the behavior analyzer unit and/or the classifier unit may also generate a classifier model based on the set of features related to the one or more expected behaviors in block 608. The process may continue in block 410 of method 400 as described above with reference to FIG. 4 as the processor executing the behavior observer unit on the mobile computing device may begin monitoring the features included in the classifier model generated in block 608 for undesirable behaviors.

Figure 7A:
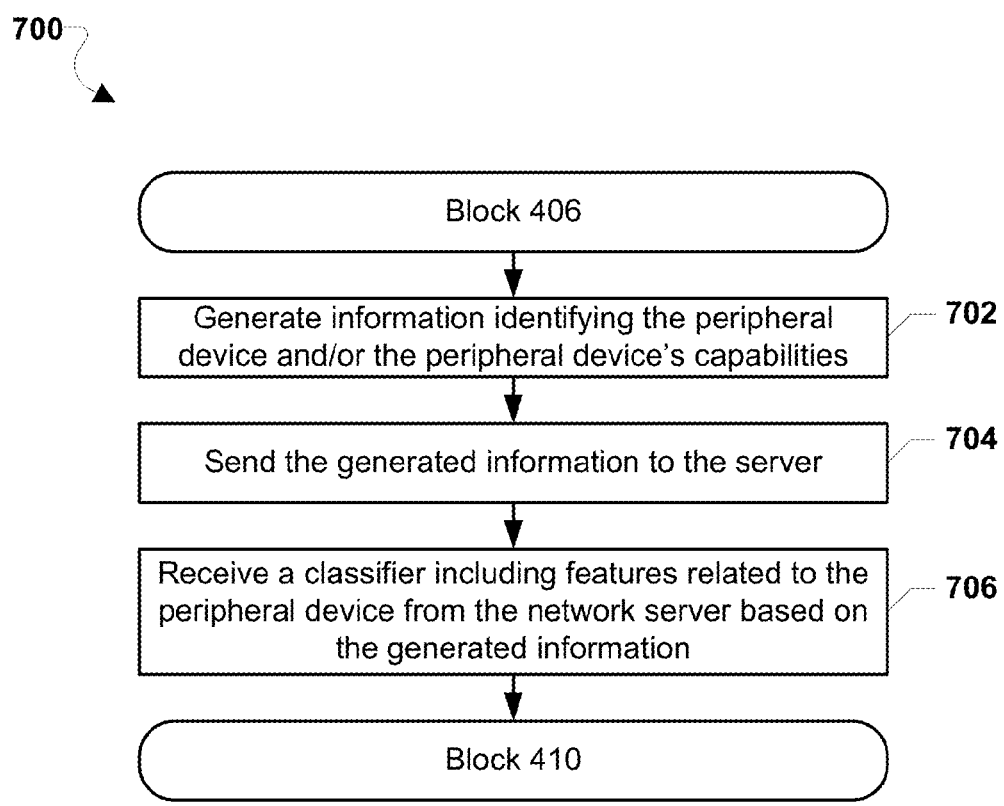
FIG. 7A is a process flow diagram illustrating an aspect method of receiving a classifier model that includes one or more features related to a peripheral device from a server by sending the server information related to the peripheral device.

FIG. 7A illustrates an aspect method 700 that may be implemented by one or more processors operating on a mobile computing device for obtaining a classifier model from a server that includes features on the mobile computing device related to a peripheral device connected to the mobile computing device.

In an aspect, one or more processors operating on the mobile computing device may be in communication with a network server (e.g., server 116 as described above with reference to FIG. 3), and the one or more processors may leverage the server's superior computing power and access to a large corpus of information to obtain a classifier model that includes features that may be especially useful in detecting malicious or performance-degrading behavior on the mobile computing device related to a peripheral device connected to the mobile computing device.

The operations of method 700 implement an aspect of the operations of block 408 of method 400 described above with reference to FIG. 4 and may begin after the processor executing the feature generator unit identifies the peripheral device in block 406 of method 400.

In block 702, the processor executing the behavior analyzer unit may generate information identifying the peripheral device connected to the mobile computing device and/or the capabilities of the peripheral device. In a further aspect of the operations performed in block 702, the processor executing the behavior analyzer unit may also include additional information in the information sent to the server to identify the mobile computing device (e.g., device ID number, model/serial number, etc.) sufficient to enable the server to identify features related to the peripheral device that may affect the mobile computing device, such as by enabling the server to perform a database look-up operation using the identifying information. The processor executing the behavior analyzer unit may send the information generated in block 702 to the server in block 704, such as by utilizing or extending an API used to communicate with the server.

In block 706, the processor executing the behavior analyzer unit may receive a classifier model (e.g., a lean classifier model) from the server that includes features related to the peripheral device based on the generated information sent to the server in block 704. As such, the classifier model may include features on the mobile computing device that are related to the peripheral device in the form of boosted decision stumps, test conditions, etc., and the processor executing the behavior analyzer unit may use the boosted decision stumps to classify a behavior related to the peripheral device as benign or malicious/performance-degrading as described above with reference to FIGS. 2A and 2B.

The process may continue in block 410 of method 400 described above with reference to FIG. 4 as the processor executing the behavior observer unit on the mobile computing device (and/or on the peripheral device) may monitor behaviors on the mobile computing device for the features related to the peripheral device that are included in the classifier received from the server for undesirable behaviors.

Figure 7B:
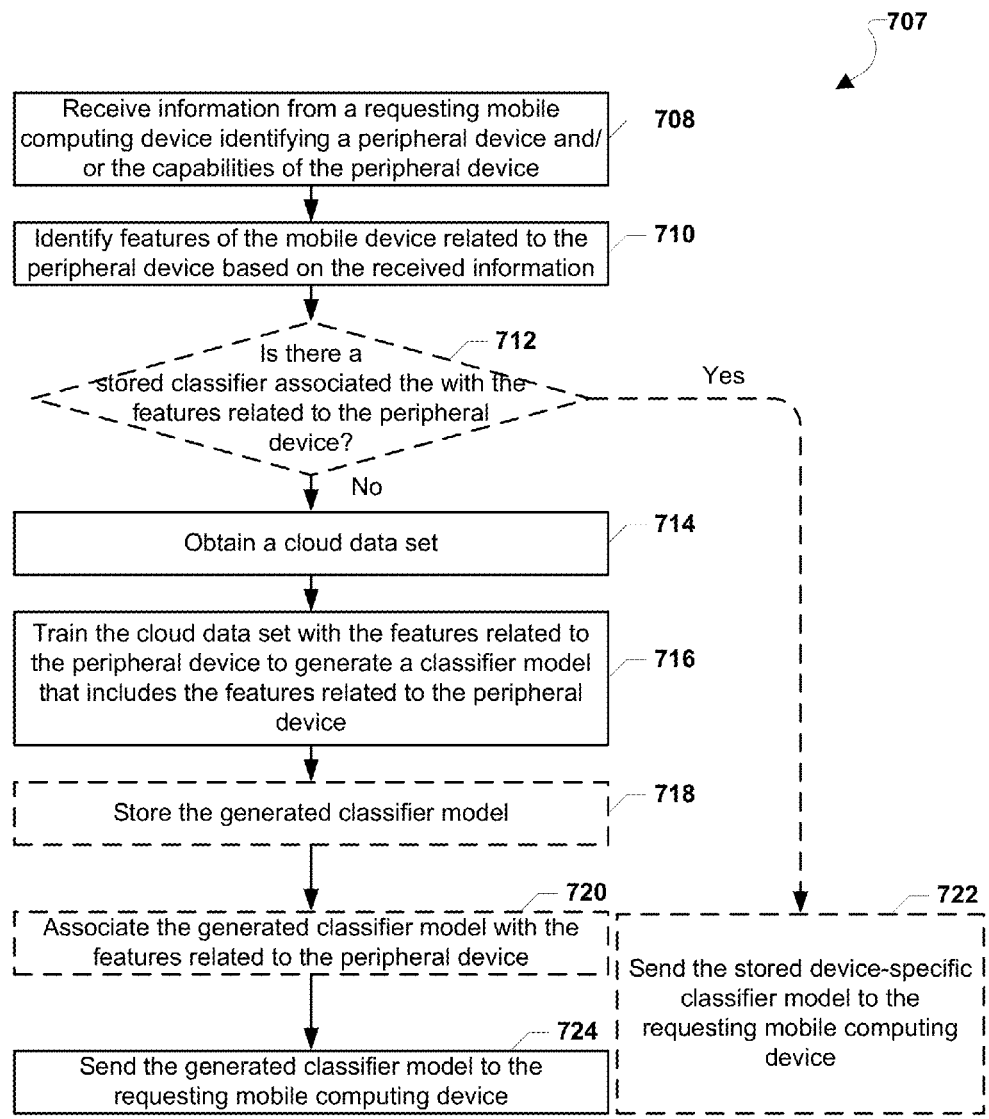
FIG. 7B is a process flow diagram illustrating an aspect method of generating on a server a classifier model that includes features related to a peripheral device in response to receiving information identifying the peripheral device and/or the peripheral device's capabilities.

FIG. 7B illustrates an aspect method 707 that may be implemented by a processor executing a model generator unit on a server for sending a classifier model to a mobile computing device in response to receiving information from the device that identifies a peripheral device connected to the mobile computing device and/or one or more of the peripheral device's capabilities, functionality, states, and features. As described above with reference to FIG. 3, the server processor executing the model generator unit may have access to a vast amount of crowd-sourced information (i.e., a cloud data set) that the server processor may use to create behavior classifiers. Given its access to such a large data set of behavioral information, the server processor executing the model generator unit may be particularly suited for generating classifier models that are specifically tailored for mobile computing devices that are connected to particular peripheral devices. Thus, in an aspect, the model generator unit may provide highly effective and specialized classifier models to mobile computing devices that include features related to one or more peripheral devices connected to the mobile computing devices.

In block 708, the server processor executing the model generator unit may receive information from a requesting mobile computing device identifying a peripheral device connected to the mobile computing device and/or capabilities of that peripheral device. In another aspect of the operations of block 602, the information received from the mobile computing device may also include information identifying the mobile computing device and or the device's capabilities. The identifying information for the peripheral device and/or the mobile computing device may also include information (e.g., model numbers, serial numbers, software versions, functions, etc.) that the server processor executing the model generator unit may use to determine the capabilities/functionalities of the peripheral device and/or the mobile computing device.

In block 710, the model generator unit may identify features of the mobile computing device related to the peripheral device based on the identifying information received in block 708. In an aspect of the operations performed in block 710, the server processor executing the model generator unit may determine features of the mobile computing device related to the peripheral device solely based on the received identifying information when that information includes a set of features present on the requesting mobile computing device. In another aspect, the model generator unit may access a classifier database and may retrieve features associated with the identifying information for the mobile computing device and/or the peripheral device as described above. For example, the model generator unit may perform a lookup of the features associated with a particular model number or device type included in the received identifying information. In another example, the server processor executing the model generator unit may also perform a lookup to identify features corresponding with the current state/configuration of the requesting mobile computing device and/or the peripheral device as described in the received identifying information.

In optional determination block 712, the model generator unit may determine whether there is a stored classifier model associated with the features related to peripheral device identified in block 710. In an optional aspect, the server processor executing the model generator unit may have previously stored classifier models for mobile computing devices that include features related to the peripheral device in a classifier database (as further described below with reference to blocks 718 and 720), and the server processor may attempt to recall a previously generated classifier model that includes the features related to the peripheral device identified in block 710 instead of regenerating another classifier model based on the same features, thereby saving time and processing resources. Thus, similar mobile computing devices may request a classifier model that includes features related to the same peripheral device, and instead of generating a model from scratch for each of those mobile computing devices, the model generator unit may send a previously generated model that includes the features related to the peripheral device currently connected to the requesting mobile computing device.

In response to the server processor executing the model generator unit determining that there is a stored classifier model that includes the features related to the peripheral device identified in block 710 (i.e., optional determination block 712="Yes"), the server processor may send the stored classifier model to the requesting mobile computing device in optional block 722. Upon receiving the stored device-specific lean classifier model, the requesting mobile computing device may begin using the model to monitor for undesirable behavior as described above with reference to FIG. 7A.

In response to the server processor executing the model generator unit determining that there is no stored classifier model that includes the features related to the peripheral device identified in block 710 (i.e., optional determination block 712="No"), the processor may obtain a cloud data set in block 714 that includes features present on multiple different models/types of mobile computing devices and peripheral devices. In an aspect, in performing the above operations in block 714, the model generator unit may retrieve the cloud data set from a cloud unit as described above with reference to FIG. 3. The model generator unit may also train the cloud data set obtained in block 608 with the features identified in block 710 to generate a classifier model for the mobile computing device that includes the features related to the peripheral device in block 716. In other words, the server processor executing the model generator unit may process the cloud data set or a full classifier model developed from the cloud data set to filter out classifiers related to features that are irrelevant to the peripheral device connected to the requesting mobile computing device in order to generate a classifier model that may enable the mobile computing device to efficiently and effectively monitor features on the mobile computing device related to the peripheral device for malicious and/or performance-degrading behavior. For example, the server processor executing the model generator unit may run a full machine-learning training algorithm using the features identified in block 710 to choose the classifier model that best represents the capabilities of the requesting mobile computing device in light of the peripheral device connected to the requesting mobile computing device. In a further aspect, the model generator unit may generate one or more sets of boosted decision stumps corresponding to each feature related to the peripheral device.

In optional block 718, the server processor executing the model generator unit may store the classifier model generated in block 716, for example, by storing it in a classifier database (not shown). In optional block 720, the server processor executing the model generator unit may also associate the classifier model generated in block 716 with the features related to the peripheral device identified in block 710. In another aspect, the server processor executing the model generator unit may manage the list of stored classifier models, thereby enabling the server processor to perform database lookup operations in the future to obtain stored classifier models matching the capabilities and/or features related to the peripheral device and present on a requesting mobile computing device and/or the peripheral device.

In block 724, the server processor executing the model generator unit may send to the requesting mobile computing device the classifier model generated in block 716, which the mobile computing device may begin using to monitor the features on the mobile computing device related to the peripheral device for undesirable behavior as described above with reference to FIG. 7A.

Figure 8:
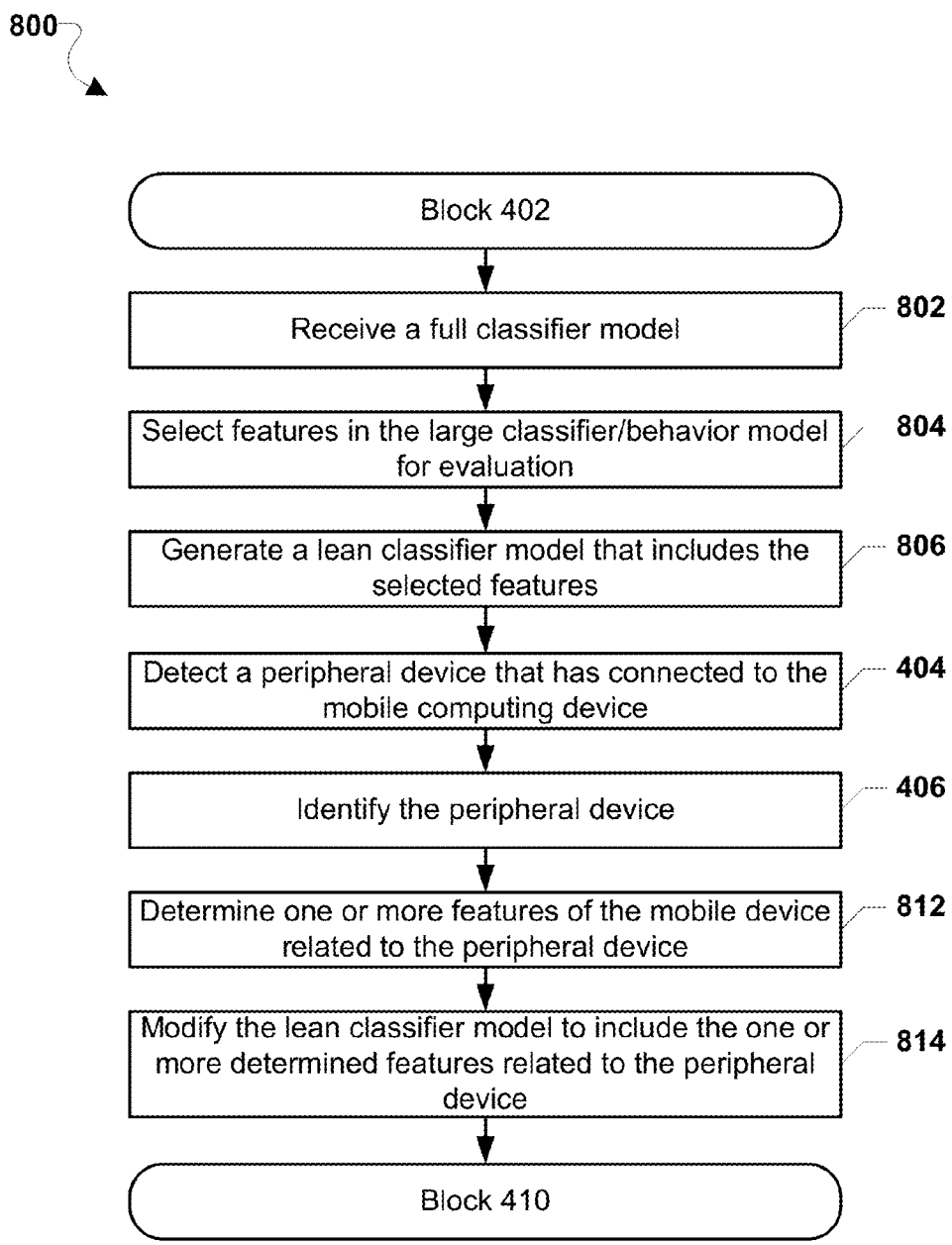
FIG. 8 is a process flow diagram illustrating an aspect method of generating a classifier model that includes one or more features related to a peripheral device by modifying a lean classifier model generated on the mobile computing device.

FIG. 8 illustrates an aspect method 800 that may be implemented by one or more processors operating on a mobile computing device for modifying a lean classifier model to include features related to a peripheral device connected to the mobile computing device. The operations of method 800 implement an aspect of the operations of block 402-408 of method 400 described above with reference to FIG. 4 and may begin after the mobile computing device powers on in block 402.

In block 802, a processor on the mobile computing device may receive a full classifier model that includes or identifies a large number of features and/or a plurality of test conditions associated with the features. In an aspect, the full classifier model may include a plurality of boosted decision trees or stumps that are suitable for use by the mobile computing device in classifying a behavior as benign or undesirable (e.g., malicious or performance degrading), such as by applying behavior vector values as inputs to the boosted decision stumps/trees to test a conditions relating to a feature of the mobile computing device.

Applying behavior vector values to a large number of stumps/trees to test multiple features in large classifier model may be taxing on the mobile computing device. For example, these operations may occupy the processor and memory functions to the detriment of the performance of other processes of the mobile computing device. These operations may also deplete the battery power of the mobile computing device. To help reduce these diminishing affects on the mobile computing device's performance, the mobile computing device may implement a joint feature selection and pruning algorithm to generate a lean classifier model from the large classifier model as described above with reference to FIG. 3.

In block 804, the processor executing the behavior analyzer unit may select features in the large classifier model to monitor and to evaluate in order to classify related mobile computing device behaviors. Various criteria may be used to select the features and boosted decision stumps from the large classifier model. For example, a rule of the joint feature selection and pruning algorithm may specify selecting features considered vital to the proper operation of the mobile computing device, like processor, memory, and communication features. The rule may also specify a first number of features (e.g. the first 50, 100, 200, 1,000, etc.) that may be appropriate when the large classifier model is ordered in a manner from most to least vital or common mobile computing device features.

In block 806, the behavior analyzer unit operating in the processing core may generate the lean classifier model from the features selected in block 804 to test the behavior of at least one feature of the mobile computing device. In an aspect, the behavior analyzer unit may scan through the list of boosted decision stumps included in the large classifier unit and incorporate into the lean classifier model every boosted decision stump that tests or is answered by at least one of the selected features. Thus, in an aspect, the lean classifier model may include both the selected features and the boosted decision stumps associated with those selected features.

The processor executing the feature monitoring engine may detect a peripheral device that has connected to the mobile computing device in block 404, and the processor executing the feature generator unit may identify the peripheral device in block 406 as described above with reference to FIG. 4.

In block 812, the processor executing the feature generator may determine one or more features of the mobile computing device related to the peripheral device. In an aspect of the operations of block 812, the processor executing the feature generator unit may determine these features based on the peripheral device's capabilities as described above with reference to FIG. 5 and/or based on behaviors related to the peripheral device that are expected to occur as described above with reference to FIG. 6. The processor executing the feature generator unit may also obtain the features related to the peripheral device from a server as described above with reference to FIG. 7A.

The processor executing the behavior analyzer unit and/or the classifier unit may modify the lean classifier model generated in block 806 to include the one or more features related to the peripheral device that were determined in block 812. In an aspect of the operations performed in block 814, the processor executing the behavior analyzer unit may modify the lean classifier model to reflect the features present on the peripheral device and the features on the mobile computing device that are related to and/or depend on the peripheral device without needing to contact the server, such as by incorporating the features determined in block 812 into the lean classifier generated in block 806. In other words, the processor executing the behavior observer unit on the mobile computing device and, optionally, on the peripheral device may begin observing the features related to the peripheral device for undesirable activity as described above.

The process may continue in block 410 of method 400 described above with reference to FIG. 4 as the processor executing the behavior observer unit may begin observing behaviors on the mobile computing device related to the peripheral device features included in the modified classifier model.

Figure 9:
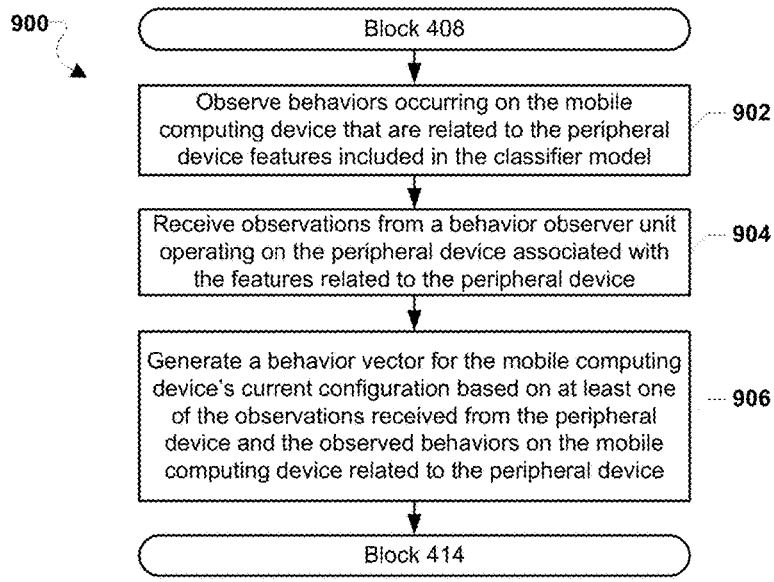
FIG. 9 is a process flow diagram illustrating an aspect method of generating behavior vectors on a mobile computing device based on behavior observations related to a peripheral device made on the mobile computing device and/or received from the peripheral device.

FIG. 9 illustrates an aspect method 900 that may be implemented by one or more processors executing on a mobile computing device for generating a behavior vector based on mobile computing device observations received from behavior observer units operating on the mobile computing device and/or the peripheral device. The operations of method 900 implement an aspect of the operations of blocks 410-412 of method 400 described above with reference to FIG. 4 and may begin after the mobile computing device has obtained a classifier model that tests the behavior of features on the mobile computing device related to a peripheral device that is connected to the mobile computing device in block 408 of method 400.

In block 902, the processor executing the behavior observer unit may observe behaviors occurring on the mobile computing device related to the peripheral device features included in the classifier model obtained in block 408, such as by observing the various processes, applications, configurations, states, etc. on the mobile computing device that may be involved with interacting with the peripheral device (e.g., features for controlling the peripheral device and/or expanded features on the mobile computing device enabled by the peripheral device). In other words, in performing the operations of block 902, the processor executing the behavior observer unit focus on behaviors occurring locally on the mobile computing device that may affect or be affected by the peripheral device.

In block 904, the processor executing the behavior observer unit may also receive observations from a behavior observer unit operating on the peripheral device that describe or characterize the peripheral device's behaviors relative to the features included in the classifier model obtained in block 408. In an aspect (not shown), the processor executing the behavior analyzer unit may cause the mobile computing device to send information that may configure the behavior observer unit operating on the peripheral device to observe behaviors occurring on the peripheral device that may be useful in classifying the behaviors of the features included in the classifier model obtained in block 408 of method 400 described above with reference to FIG. 4. In other words, while the processor executing the behavior observer unit on the mobile computing device is monitoring various characteristics, features, processes, etc. on the mobile computing device for malicious/performance-degrading activity related to the peripheral device, the behavior observer unit on the peripheral device may monitor behaviors occurring on the peripheral device that are related to the mobile computing device. Specifically, the behavior observer unit on the peripheral device may monitor features related to communications and/or input exchanged with the mobile computing device that may be useful in determining whether the peripheral device is causing malicious/performance-degrading behavior to occur on the mobile computing device, whether the mobile computing device is causing malicious/performance-degrading behavior to occur on the peripheral device, or whether the activities of both devices is causing malicious/performance-degrading behavior to occur on one or both of those devices. Thus, in an aspect, the behavior observer unit on the peripheral device may be in a better position to observe the activities and behaviors occurring on the peripheral device or between the peripheral device and the mobile computing device than the behavior observer unit operating on the mobile computing device. In such an aspect, the mobile computing device may leverage the perspective of the behavior observer unit operating on the peripheral device to more accurately determine whether malicious/performance-degrading behavior on the mobile computing device related to the peripheral device is occurring.

In block 906, the processor executing the behavior analyzer unit may generate a behavior vector for the mobile computing device's current configuration based on at least one of the observations received from the peripheral device in block 904 and the behaviors observed on the mobile computing device related to the peripheral device in block 902. In an aspect of the operations performed in block 906, the processor executing the behavior analyzer unit may utilize observations from the behavior observer unit operating on the peripheral device whenever the peripheral device includes such a behavior observer unit. Further, for legacy/older peripheral devices that do not include a behavior observer unit, the processor executing the behavior analyzer unit may generate the behavior vector based solely on the observations from the behavior observer unit operating on the mobile computing device.

The process may continue starting in block 414 of method 400 described above with reference to FIG. 4 as the processor executing the behavior analyzer unit and/or the classifier unit may apply the behavior vector generated in block 906 to the classifier model obtained in block 408 of method 400 to determine whether malicious/performance-degrading behavior on the mobile computing device related to the peripheral device is occurring.

Figure 10:
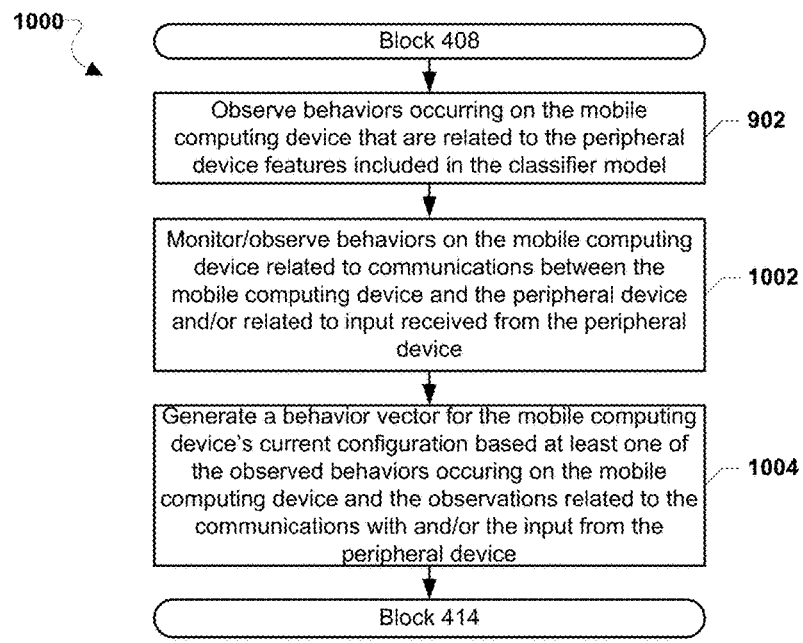
FIG. 10 is a process flow diagram illustrating an aspect method of generating behavior vectors on a mobile computing device based on communications between the mobile computing device and a peripheral device and/or based on input received on the mobile computing device from the peripheral device.

FIG. 10 illustrates an aspect method 1000 that may be implemented by one or more processors operating on a mobile computing device for generating a behavior vector based on observations related to communications and/or input received from a peripheral device connected the mobile computing device. The operations of method 1000 implement an aspect of the operations of blocks 410-412 of method 400 described above with reference to FIG. 4 and may begin after the processor executing the behavior analyzer unit obtains a classifier model that includes features on the mobile computing device related to the peripheral device in block 408 of method 400.

In an aspect, the mobile computing device may be in communication with/connected to a peripheral device that does not include specialized APIs or a dedicated behavior observer unit on the peripheral device that may enable the mobile computing device to receive direct observations and other information related to the performance, configuration, processes, behaviors, etc. on the peripheral device as described above with reference to FIG. 9. In such an aspect, the mobile computing device may be configured to interpret various communications and/or inputs received from the peripheral device in order to make indirect observations of behaviors occurring on the peripheral device that may be related to the mobile computing device when the mobile computing device is unable to make/receive direct observations such as those described above with reference to FIG. 9.

In block 902, the processor executing the behavior analyzer unit on the mobile computing device may observe behaviors occurring on the mobile computing device that are related to the features related to the peripheral device included in the classifier model received in block 408 as described above with reference to FIG. 9.

In block 1002, the processor executing the behavior observer unit may monitor and/or observe behaviors on the mobile computing device related to communications between the mobile computing device and the peripheral device and/or related to inputs received from the peripheral device on the mobile computing device. In an aspect, the processor executing the behavior observer unit may derive or infer the state of and/or behaviors occurring on the peripheral device by observing communication patterns between the devices and may correlate those communications with observable behaviors on the mobile computing device or with predicted behaviors on the peripheral device. For example, the processor executing the behavior observer unit may monitor inputs from a credit card reader peripheral device instructing the mobile computing device to secretly store credit card information. In another example, the processor executing the behavior observer unit may monitor communications from an automotive peripheral device to the mobile computing device reporting a current high rate of speed and communications from the mobile computing device to the automotive peripheral device instructing the automotive peripheral device to slowly perform a breaking/slow-down procedure.

In block 1004, the processor executing the behavior analyzer unit may generate a behavior vector for the mobile computing device's current configuration based on at least one of the observed behaviors occurring on the mobile computing device obtained in block 1002 and the observations related to the communications with and/or the input received from the peripheral device obtained in block 1002. In other words, despite not receiving direct observations of behaviors, processes, etc. on the peripheral device as described above with reference to FIG. 9, the processor computing device executing the behavior analyzer unit may intelligently generate the behavior vector to reflect an accurate state of the behaviors occurring on the mobile computing device based on observations of locally-occurring behaviors on the mobile computing device and indirect observations derived from interactions with the peripheral device.

Thus, the process may continue in block 414 of method 400 described above with reference to FIG. 4 as the processor executing the behavior analyzer unit and/or the classifier unit may apply the behavior vector generated in block 1004 to the classifier model obtained in block 408 to determine whether undesirable behavior related to the peripheral device is occurring.

Figure 11:
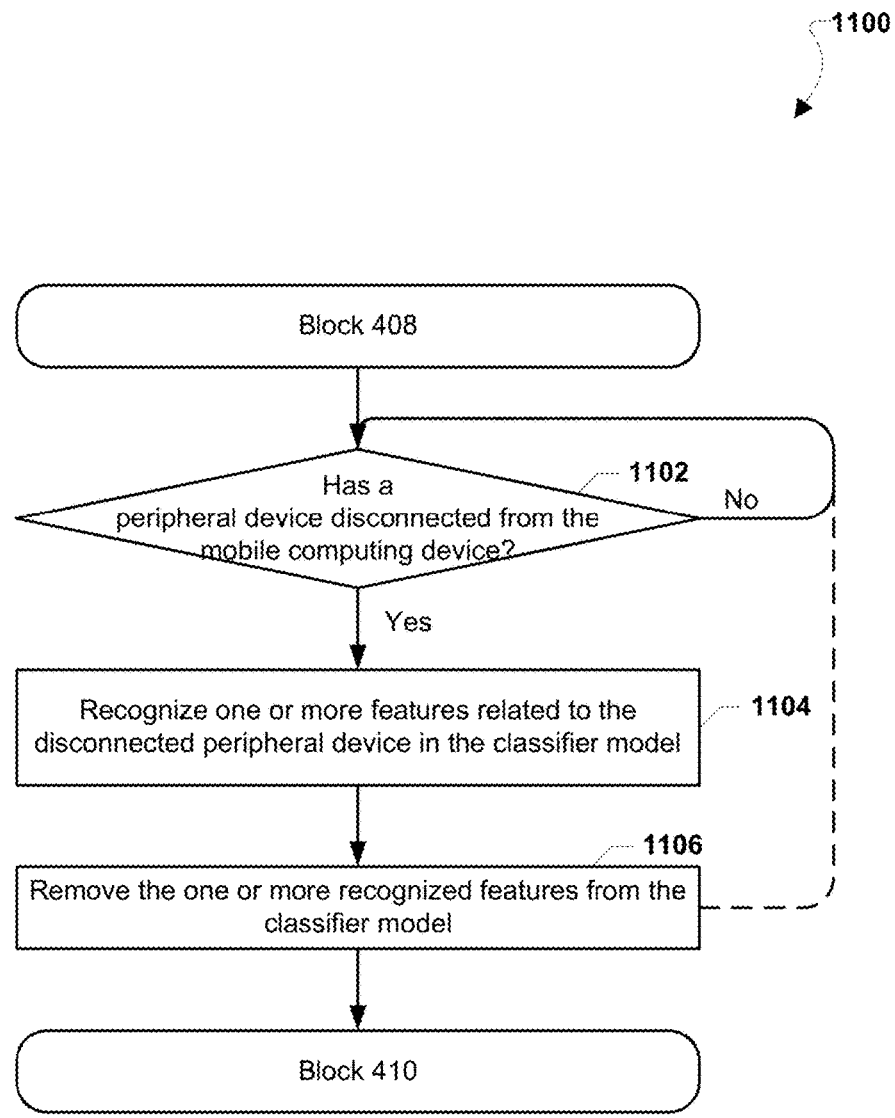
FIG. 11 is a process flow diagram illustrating an aspect method of removing features from a classifier model on a mobile computing device that are related to a peripheral device that has been disconnected from the mobile computing device.

FIG. 11 illustrates an aspect method 1100 that may be implemented by one or more processors operating on a mobile computing device for removing features in a classifier model that are related to a peripheral device that has disconnected from the computing mobile computing device.

As described above, a mobile computing device may need to monitor/observe features related to a peripheral device connected to the mobile computing device in order to detect undesirable behaviors related to that peripheral device (e.g., malicious/performance-degrading activity on the mobile computing device caused by the peripheral device and/or malicious/performance-degrading activity on the peripheral device caused by the mobile computing device). However, the features that the mobile computing device may monitor to detect such undesirable behavior may no longer be relevant when the peripheral device disconnects from the mobile computing device. Thus, in an aspect, one or more processors operating on the mobile computing device may perform the operations described below to remove features included in a classifier model (e.g., a classifier received in block 408 of method 400 described above with reference to FIG. 4) related to a disconnected peripheral device, thereby ensuring that processing and power resources are only utilizes for monitoring/observing features that are still relevant to the performance of the mobile computing device. The operations of method 1100 may begin after the processor executing the behavior analyzer unit obtains a classifier that includes features related to a peripheral device in block 408 of method 400 described above with reference to FIG. 4.

In determination block 1102, the processor executing the feature monitoring engine may determine whether a peripheral device has disconnected from the mobile computing device, such as by periodically determining the peripheral devices that are currently connected to the mobile computing device. For example, the processor executing the feature monitoring engine may detect when a wireless connection with a Bluetooth®-enabled wireless keyboard is lost or purposefully terminated. In response to the processor executing the feature monitoring engine determining that a peripheral device has not disconnected from the mobile computing device (i.e., determination block 1102="No"), the processor may continually perform the above operations in determination block 1102 until the processor recognizes that a peripheral device has disconnected from the mobile computing device.

In response to the processor executing the feature monitoring engine determining that a peripheral device has disconnected from the mobile computing device (i.e., determination block 1102="Yes"), the processor(s) executing the feature generator unit and/or the behavior analyzer unit may recognize one or more features related to the disconnected peripheral device included in the classifier model in block 1104. In an aspect, the processor(s) executing the feature generator unit and/or the behavior analyzer unit may scan through the classifier model for features related to expanded functionality/capabilities on the mobile computing device enabled by the disconnected peripheral device and/or functions on the mobile computing device related to controlling or communicating with the disconnected peripheral device. For example, the processor(s) on the mobile computing device may detect features related to controlling a disconnected automotive peripheral device (e.g., features related to "self-parking") and similar features for communicating with/receiving information from the disconnected peripheral device.

In block 1106, the processor(s) executing the feature generator unit and/or the behavior analyzer unit may remove the one or more features recognized in block 1104 from the classifier model. In a further aspect of the operations performed in block 1106, the processor(s) executing the feature generator unit and/or the behavior analyzer unit may notify the processor executing the behavior observer unit to stop observing/monitoring features removed from the classifier unit in block 1106.

In another aspect (not shown), the processor executing the feature generator unit may store the features/classifiers related to the disconnected peripheral device and may associate those features/classifiers with the disconnected peripheral device. For example, the processor may store boosted decision stumps and numerous test conditions that are associated with features related to a credit card reader peripheral device that are removed from the classifier model in response to detecting that the credit card reader peripheral device has been disconnected. In another aspect, the processor executing the feature generator unit may quickly retrieve the stored features, classifiers, boosted decision stumps, etc. associated with the disconnected peripheral device in the event that the disconnected peripheral device reconnects to the mobile computing device in the future, thereby enabling the processor executing the behavior observer unit to begin observing those retrieved features without a significant delay.

The process may continue in block 410 of method 400 described above with reference to FIG. 4 as the processor executing the behavior observer module may observe the remaining features of the classifier model (i.e., the features not recognized as related to the disconnected peripheral device in block 1104).

Figure 12:
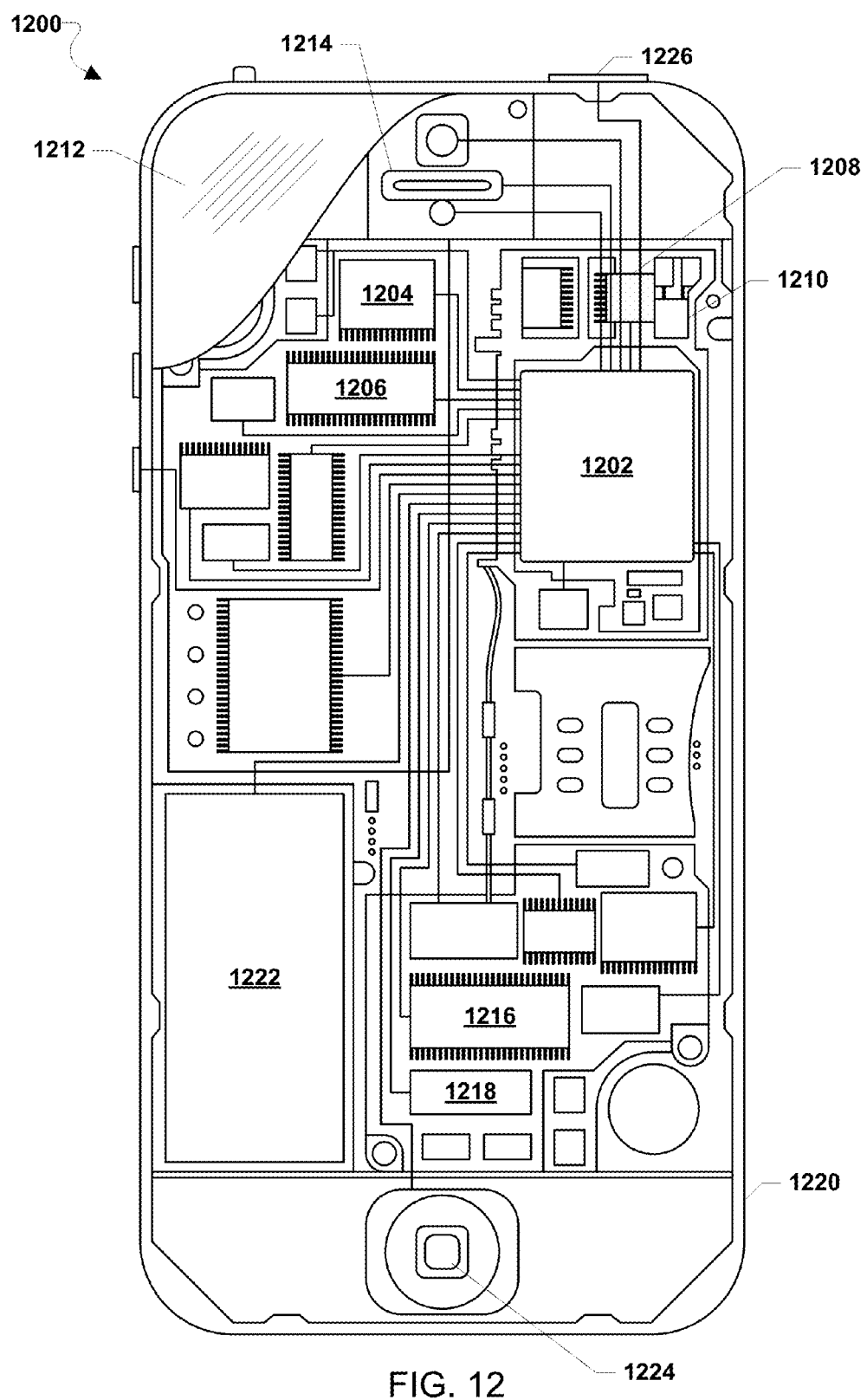
FIG. 12 is a component block diagram of a mobile computing device suitable for use in an aspect.

The various aspects may be implemented in any of a variety of mobile computing devices, an example of which is illustrated in FIG. 12. The mobile computing device 1200 may include a processor 1202 coupled to a touchscreen controller 1204 and an internal memory 1206. The processor 1202 may be one or more multi-core integrated circuits designated for general or specific processing tasks. The internal memory 1206 may be volatile or non-volatile memory, and may also be secure and/or encrypted memory, or unsecure and/or unencrypted memory, or any combination thereof. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the mobile computing device 1200 need not have touch screen capability.

The mobile computing device 1200 may have one or more radio signal transceivers 1208 (e.g., Peanut, Bluetooth®, Zigbee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The mobile computing device 1200 may include a cellular network wireless modem chip 1216 that enables communication via a cellular network and is coupled to the processor.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as USB, FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components discussed herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
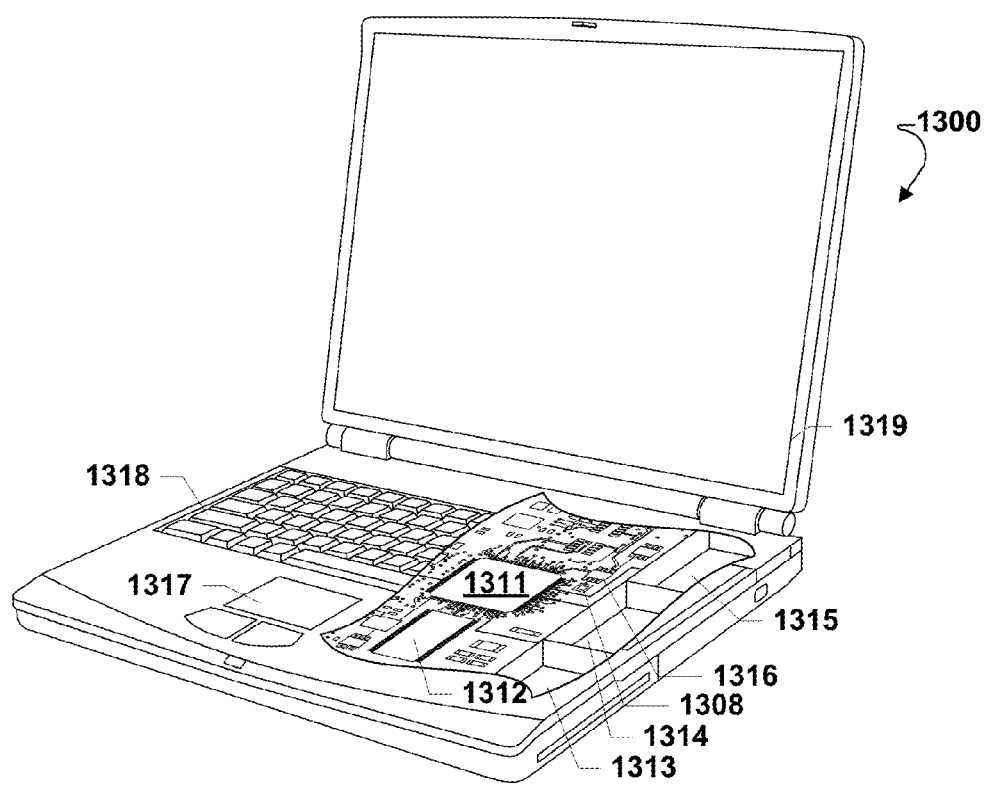
FIG. 13 is a component block diagram of a server device suitable for use in an aspect.

The various aspects described above may also be implemented within a variety of mobile computing devices, such as a laptop computer 1300 illustrated in FIG. 13. Many laptop computers include a touchpad touch surface 1317 that serves as the computer's pointing device, and thus may receive drag, scroll, and flick gestures similar to those implemented on mobile computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be use in conjunction with the various aspects.

Figure 14:
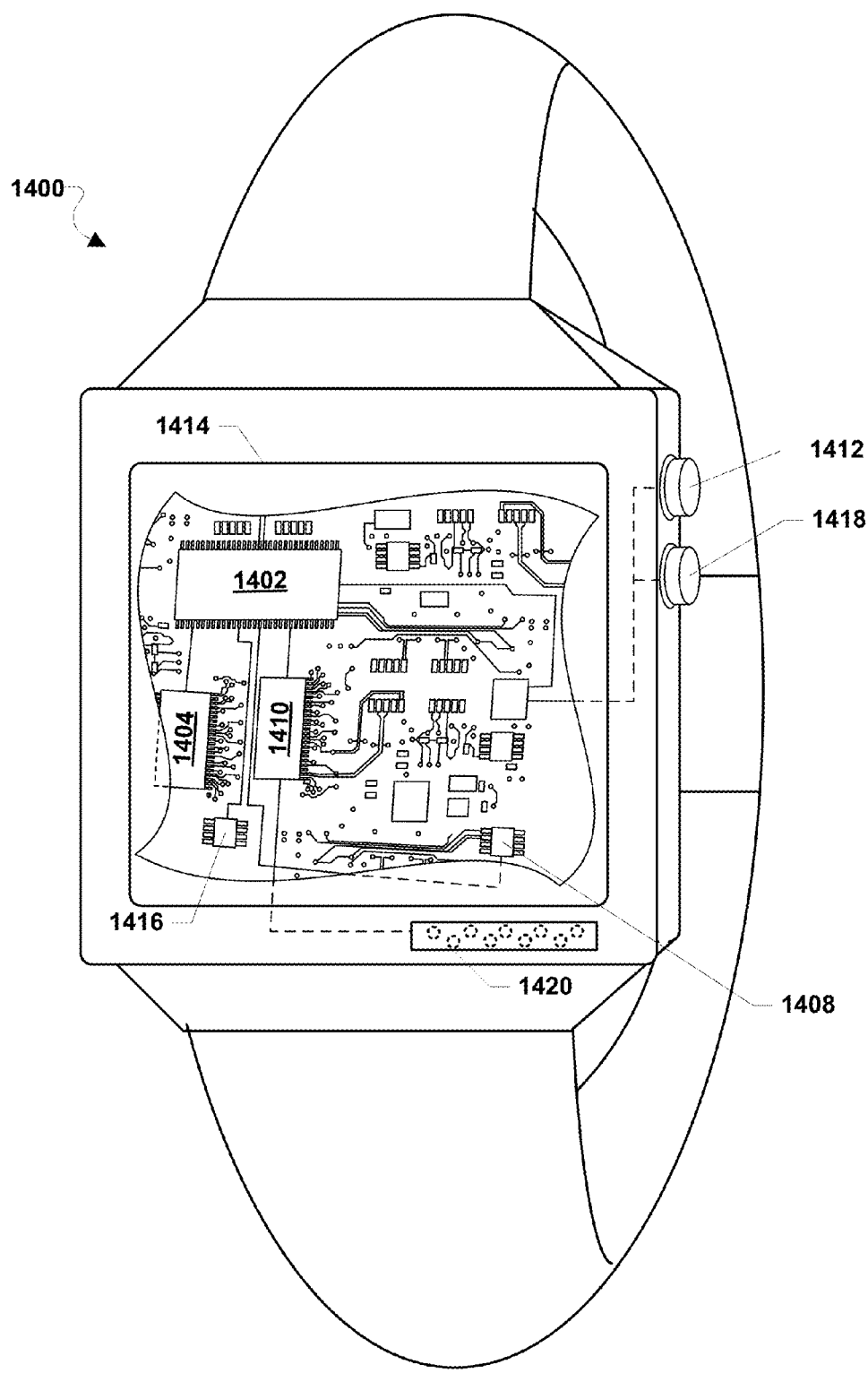
FIG. 14 is a component block diagram of a peripheral device suitable for use in an aspect.

The various aspects may be implemented with any of a variety of peripheral devices, an example of which is illustrated in FIG. 14. For example, the peripheral device 1400 may include a processor 1402 coupled to internal memory 1404. Internal memory 1404 may be volatile or non-volatile memory, and may also be secure and/or encrypted memory, or unsecure and/or unencrypted memory, or any combination thereof. The processor 1402 may also be coupled to a touch screen display 1414, such as a resistive-sensing touch screen, capacitive-sensing touch screen infrared sensing touch screen, or the like. Additionally, the display 1414 of the peripheral device 1400 need not have touch screen capability. Additionally, the peripheral device 1400 may have one or more antenna 1408 for sending and receiving electromagnetic radiation that may be connected to a transceiver 1416 coupled to the processor 1402. The peripheral device 1400 may also include a physical button 1412 for receiving user inputs. The peripheral device 1400 may also include a power button 1418 for turning the peripheral device 1400 on and off. The peripheral device may also have a power source 1410 coupled to the processor 1402, such as a disposable or rechargeable battery. The peripheral device may also have a speaker 1420 configured to output audible sound.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer-readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules/units discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, units, circuits, and algorithm steps described in connection with the aspects disclosed herein may be implemented as electronic hardware, computer software, or combinations of both. To clearly illustrate this interchangeability of hardware and software, various illustrative components, blocks, modules, units, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, units, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

The functions described in one or more aspects may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of analyzing behaviors in a mobile computing device connected to a peripheral device, comprising:
   identifying a capability related to the peripheral device connected to the mobile computing device;
   determining a feature on the mobile computing device related to the identified capability;
   generating, via a processor of the mobile computing device, a classifier model based on the determined feature, wherein the classifier model includes decision stumps that evaluate features of the mobile computing device related to the peripheral device, wherein each decision stump is a one level decision tree that includes a single node and a weight value, wherein the single node tests a condition related to a mobile device feature that is present in the mobile computing device due to the connected peripheral device;
   observing, via the processor, mobile device behaviors related to the peripheral device to collect behavior information;
   generating, via the processor, a behavior vector for a configuration of the mobile computing device based on the collected behavior information;
   applying, via the processor, the generated behavior vector to the generated classifier model to generate a result;
   using, via the processor, the generated result to determine whether one of the observed behaviors is an undesirable behavior; and
   terminating the undesirable behavior on the mobile computing device in response to determining that one of the observed behaviors is an undesirable behavior.

2. The method of claim 1, wherein using the generated result to determine whether one of the observed behaviors is the undesirable behavior comprises using the generated result to determine whether one of the observed behaviors is:
   an undesirable behavior occurring on the mobile computing device and caused by the peripheral device; or
   an undesirable behavior caused by activities occurring on both of the mobile computing device and the peripheral device.

3. The method of claim 1, wherein generating the classifier model based on the determined feature comprises:
   observing behaviors on the mobile computing device related to the peripheral device over a period of time;
   identifying a behavior related to the peripheral device that is expected to occur based on behaviors observed on the mobile computing device over the period of time;
   determining a set of features on the mobile computing device related to the expected behavior; and
   generating the classifier model based on the determined set of features related to the expected behavior.

4. The method of claim 1, wherein generating the classifier model based on the determined feature comprises:
   receiving a full classifier model generated on a server from a cloud data set of information provided by a plurality of mobile computing devices;
   generating a lean classifier model comprising features relevant to the mobile computing device;
   and
   modifying the lean classifier model to include the determined feature related to the peripheral device.

5. The method of claim 1, further comprising receiving from the peripheral device observations of behaviors occurring on the peripheral device,
   wherein generating the behavior vector for the configuration of the mobile computing device comprises generating the behavior vector based on the collected behavior information and the observations received from the peripheral device.

6. The method of claim 1, wherein observing the mobile device behaviors related to the peripheral device to collect the behavior information further comprises monitoring communications between the mobile computing device and the peripheral device, and inputs received from the peripheral device, to collect the behavior information.

7. A mobile computing device, comprising:
a memory; and
a processor coupled to the memory, and configured with processor-executable instructions to perform operations comprising:
identifying a capability related to a peripheral device connected to the mobile computing device;
determining a feature on the mobile computing device related to the identified capability;
generating a classifier model based on the determined feature, wherein the classifier model includes decision stumps that evaluate features of the mobile computing device related to the peripheral device connected to the mobile computing device, wherein each decision stump is a one level decision tree that includes a single node and a weight value, wherein the single node tests a condition related to a mobile device feature that is present in the mobile computing device due to the connected peripheral device;
observing mobile device behaviors related to the peripheral device to collect behavior information;
generating a behavior vector for a configuration of the mobile computing device based on the collected behavior information;
applying the generated behavior vector to the generated classifier model to generate a result;
using the generated result to determine whether one of the observed behaviors is an undesirable behavior; and
terminating the undesirable behavior on the mobile computing device in response to determining that one of the observed behaviors is an undesirable behavior.

8. The mobile computing device of claim 7, wherein the processor is configured with processor-executable instructions to perform operations such that using the generated result to determine whether one of the observed behaviors is the undesirable behavior comprises using the generated result to determine whether one of the observed behaviors is:
an undesirable behavior occurring on the mobile computing device and caused by the peripheral device; or
an undesirable behavior caused by activities occurring on both of the mobile computing device and the peripheral device.

9. The mobile computing device of claim 7, wherein the processor is configured with processor-executable instructions to perform operations such that generating the classifier model based on the determined feature comprises:
observing behaviors on the mobile computing device related to the peripheral device over a period of time;
identifying a behavior related to the peripheral device that is expected to occur based on behaviors observed on the mobile computing device over the period of time;
determining a set of features on the mobile computing device related to the expected behavior; and
generating the classifier model based on the determined set of features related to the expected behavior.

10. The mobile computing device of claim 7, wherein the processor is configured with processor-executable instructions to perform operations such that generating the classifier model based on the determined feature comprises:
receiving a full classifier model generated on a server from a cloud data set of information provided by a plurality of mobile computing devices;
generating a lean classifier model comprising features relevant to the mobile computing device; and
modifying the lean classifier model to include the determined feature related to the peripheral device.

11. The mobile computing device of claim 7, wherein:
the processor is configured with processor-executable instructions to perform operations further comprising receiving from the peripheral device observations of behaviors occurring on the peripheral device; and
the processor is configured with processor-executable instructions to perform operations such that generating the behavior vector for the configuration of the mobile computing device comprises generating the behavior vector based on the collected behavior information and the observations received from the peripheral device.

12. The mobile computing device of claim 7, wherein:
the processor is configured with processor-executable instructions to perform operations such that observing the mobile device behaviors related to the peripheral device to collect the behavior information further comprises monitoring communications between the mobile computing device and the peripheral device, and inputs received from the peripheral device, to collect the behavior information.

13. A mobile computing device, comprising:
means for identifying a capability related to a peripheral device connected to the mobile computing device;
means for determining a feature on the mobile computing device related to the identified capability;
means for generating a classifier model based on the determined feature includes decision stumps that evaluate features of the mobile computing device related to the peripheral device connected to the mobile computing device, wherein each decision stump is a one level decision tree that includes a single node and a weight value, wherein the single node tests a condition related to a mobile device feature that is present in the mobile computing device due to the connected peripheral device;
means for observing mobile device behaviors related to the peripheral device to collect behavior information;
means for generating a behavior vector for a configuration of the mobile computing device based on the collected behavior information;
means for applying the generated behavior vector to the generated classifier model to generate a result;
means for using the generated result to determine whether one of the observed behaviors is an undesirable behavior; and
means for terminating the undesirable behavior on the mobile computing device in response to determining that one of the observed behaviors is an undesirable behavior.

14. The mobile computing device of claim 13, wherein means for using the generated result to determine whether one of the observed behaviors is the undesirable behavior comprises means for using the generated result to determine whether one of the observed behaviors is:
an undesirable behavior occurring on the mobile computing device and caused by the peripheral device; or
an undesirable behavior caused by activities occurring on both of the mobile computing device and the peripheral device.

15. The mobile computing device of claim 13, wherein means for generating the classifier model based on the determined feature comprises:

means for observing behaviors on the mobile computing device related to the peripheral device over a period of time;

means for identifying a behavior related to the peripheral device that is expected to occur based on behaviors observed on the mobile computing device over the period of time;

means for determining a set of features on the mobile computing device related to the expected behavior; and means for generating the classifier model based on the determined set of features related to the expected behavior.

16. The mobile computing device of claim 13, wherein means for generating the classifier model based on the determined feature comprises:

means for receiving a full classifier model generated on a server from a cloud data set of information provided by a plurality of mobile computing devices;

means for generating a lean classifier model comprising features relevant to the mobile computing device; and means for modifying the lean classifier model to include the determined feature related to the peripheral device.

17. The mobile computing device of claim 13, further comprising means for receiving from the peripheral device observations of behaviors occurring on the peripheral device, wherein means for generating the behavior vector for the configuration of the mobile computing device comprises means for generating the behavior vector based on the collected behavior information and the observations received from the peripheral device.

18. The mobile computing device of claim 13, wherein means for observing the mobile device behaviors related to the peripheral device to collect the behavior information further comprises means for monitoring communications between the mobile computing device and the peripheral device, and inputs received from the peripheral device, to collect the behavior information.

19. A non-transitory computer-readable storage medium having stored thereon processor-executable software instructions configured to cause a processor of a mobile computing device to perform operations comprising:

identifying a capability related to the peripheral device connected to the mobile computing device;

determining a feature on the mobile computing device related to the identified capability;

generating a classifier model based on the determined feature includes decision stumps that evaluate features of the mobile computing device related to the peripheral device connected to the mobile computing device, wherein each decision stump is a one level decision tree that includes a single node and a weight value, wherein the single node tests a condition related to a mobile device feature that is present in the mobile computing device due to the connected peripheral device;

observing mobile device behaviors related to the peripheral device to collect behavior information;

generating a behavior vector for a configuration of the mobile computing device based on the collected behavior information;

applying the generated behavior vector to the generated classifier model to generate a result;

using the generated result to determine whether one of the observed behaviors is an undesirable behavior; and terminating the undesirable behavior on the mobile computing device in response to determining that one of the observed behaviors is an undesirable behavior.

20. The non-transitory computer-readable storage medium of claim 19, wherein the stored processor-executable software instructions are configured to cause a processor to perform operations such that using the generated result to determine whether one of the observed behaviors is the undesirable behavior comprises using the generated result to determine whether one of the observed behaviors is:

an undesirable behavior occurring on the mobile computing device and caused by the peripheral device; or an undesirable behavior caused by activities occurring on both of the mobile computing device and the peripheral device.

21. The non-transitory computer-readable storage medium of claim 19, wherein the stored processor-executable software instructions are configured to cause a processor to perform operations such that generating the classifier model based on the determined feature comprises:

observing behaviors on the mobile computing device related to the peripheral device over a period of time;

identifying a behavior related to the peripheral device that is expected to occur based on behaviors observed on the mobile computing device over the period of time;

determining a set of features on the mobile computing device related to the expected behavior; and generating the classifier model based on the determined set of features related to the expected behavior.

22. The non-transitory computer-readable storage medium of claim 19, wherein the stored processor-executable software instructions are configured to cause a processor to perform operations such that generating the classifier model based on the determined feature comprises:

receiving a full classifier model generated on a server from a cloud data set of information provided by a plurality of mobile computing devices;

generating a lean classifier model comprising features relevant to the mobile computing device; and modifying the lean classifier model to include the determined feature related to the peripheral device.

23. The non-transitory computer-readable storage medium of claim 19, wherein:

the stored processor-executable software instructions are configured to cause a processor to perform operations further comprising receiving from the peripheral device observations of behaviors occurring on the peripheral device; and the stored processor-executable software instructions are configured to cause a processor to perform operations such that generating the behavior vector for the configuration of the mobile computing device comprises generating the behavior vector based on the collected behavior information and the observations received from the peripheral device.

24. The non-transitory computer-readable storage medium of claim 19, wherein:

the stored processor-executable software instructions are configured to cause a processor to perform operations such that observing the mobile device behaviors related to the peripheral device to collect the behavior information further comprises monitoring communications between the mobile computing device and the peripheral device, and inputs received from the peripheral device, to collect the behavior information.

* * * * *